United States Patent
Li et al.

(10) Patent No.: US 11,470,610 B2
(45) Date of Patent: Oct. 11, 2022

(54) RESOURCE MAPPING METHOD AND DEVICE

(71) Applicant: Huawei Technologies Co., Ltd., Shenzhen (CN)

(72) Inventors: Junchao Li, Shanghai (CN); Xu Zhang, Beijing (CN); Yi Wang, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 16/925,380

(22) Filed: Jul. 10, 2020

(65) Prior Publication Data

US 2020/0344758 A1   Oct. 29, 2020

Related U.S. Application Data

(63) Continuation of application No. PCT/CN2019/071364, filed on Jan. 11, 2019.

(30) Foreign Application Priority Data

Jan. 12, 2018 (CN) .......................... 201810032421.0
Jan. 23, 2018 (CN) .......................... 201810065051.0

(51) Int. Cl.
   *H04W 72/04* (2009.01)

(52) U.S. Cl.
   CPC ... *H04W 72/0453* (2013.01); *H04W 72/0493* (2013.01)

(58) Field of Classification Search
   CPC ......... H04W 72/0453; H04W 72/0493; H04W 72/0406; H04L 1/0071; H04L 5/0064; H04L 5/0007; H04L 5/0048
   See application file for complete search history.

(56) References Cited

U.S. PATENT DOCUMENTS

| 2015/0131546 A1 | 5/2015 | Seo et al. |
| 2017/0142719 A1 | 5/2017 | Seo et al. |

(Continued)

FOREIGN PATENT DOCUMENTS

| CN | 102412951 A | 4/2012 |
| WO | 2009082851 A1 | 7/2009 |
| WO | 2009088911 A1 | 7/2009 |

OTHER PUBLICATIONS

62615406,Specification (Year: 2018).*
62616034,Specification (Year: 2018).*
LG Electronics "Discussion on resource allocation and TBS determination," 3GPP TSG RAN WG1 Meeting 91, Reno, USA, Nov. 27-Dec. 1, 2017, R1-1719929, 16 pages.
3GPP TS 38.211 V1.2.1 (Dec. 2017), 3rd Generation Partnership Project;Technical Specification Group Radio Access Network; NR; Physical channels and modulation (Release 15), 87 pages.

(Continued)

*Primary Examiner* — Un C Cho
*Assistant Examiner* — Yu-Wen Chang
(74) *Attorney, Agent, or Firm* — Slater Matsil, LLP

(57) ABSTRACT

This application provides a resource mapping method and a device. A network device writes n physical resource block groups into an interleaving matrix row by row, where N null values are inserted into intersections between the first row and the last N columns of the interleaving matrix or intersections between the last row and the first N columns of the interleaving matrix, n is a positive integer, and N is a natural number; reads the n physical resource block groups from the interleaving matrix column by column, where the n read physical resource block groups are mapped to n virtual resource block groups; and determines, based on the n physical resource block groups mapped to the n virtual resource block groups, physical resource blocks mapped to virtual resource blocks in the n virtual resource block groups.

18 Claims, 9 Drawing Sheets

---

Write n physical resource block groups into an interleaving matrix row by row, where N null values are inserted into intersections between the first row and the last N columns of the interleaving matrix or intersections between the last row and the first N columns of the interleaving matrix, n is a positive integer, and N is a natural number — 101

Read the n physical resource block groups from the interleaving matrix column by column, where the n read physical resource block groups are mapped to n virtual resource block groups — 102

Determine, based on the n physical resource block groups mapped to the n virtual resource block groups, physical resource blocks mapped to virtual resource blocks in the n virtual resource block groups — 103

(56) References Cited

U.S. PATENT DOCUMENTS

| | | | | |
|---|---|---|---|---|
| 2017/0223686 A1* | 8/2017 | You | ............... | H04L 5/0048 |
| 2019/0069276 A1* | 2/2019 | Kwak | ............ | H04L 5/0048 |
| 2019/0150118 A1* | 5/2019 | Nam | ............ | H04L 5/0094 |
| | | | | 370/329 |
| 2019/0159182 A1* | 5/2019 | Ranta-aho | ...... | H04W 72/0453 |
| 2019/0215809 A1* | 7/2019 | Yang | ............ | H04L 25/0204 |
| 2019/0260548 A1* | 8/2019 | Parkvall | ......... | H04L 5/0053 |
| 2019/0334585 A1* | 10/2019 | Lee | ............ | H04L 1/0071 |
| 2020/0021410 A1* | 1/2020 | Choi | ............ | H04W 72/04 |
| 2020/0120680 A1* | 4/2020 | Hwang | ......... | H04W 72/0493 |
| 2020/0244420 A1* | 7/2020 | Wang | ............ | H04W 72/1263 |
| 2020/0382249 A1* | 12/2020 | Xing | ............ | H03M 13/2789 |
| 2021/0083803 A1* | 3/2021 | Sheng | .......... | H04W 76/27 |

OTHER PUBLICATIONS

3GPP TS 38.211 V2.0.0 (Dec. 2017), 3rd Generation Partnership Project; Technical Specification Group Radio Access Network; NR; Physical channels and modulation (Release 15), 73 pages.

3GPP TS 38.214 V15.0.0 (Dec. 2017), 3rd Generation Partnership Project; Technical Specification Group Radio Access Network; NR; Physical layer procedures for data (Release 15), 71 pages.

Catt et al, "DVRB mapping in DwPTS and Draft CR for 36.211", 3GPP TSG RAN WG1 meeting #54, R1-082960, Jeju, Korea, Aug. 18-22, 2008, 11 pages.

Catt et al, "DVRB mapping in DwPTS and TP for 36.211", 3GPP TSG RAN WG1 meeting #53bis, R1-082562, Warsaw, Poland, Jun. 30-Jul. 4, 2008, 7 pages.

* cited by examiner

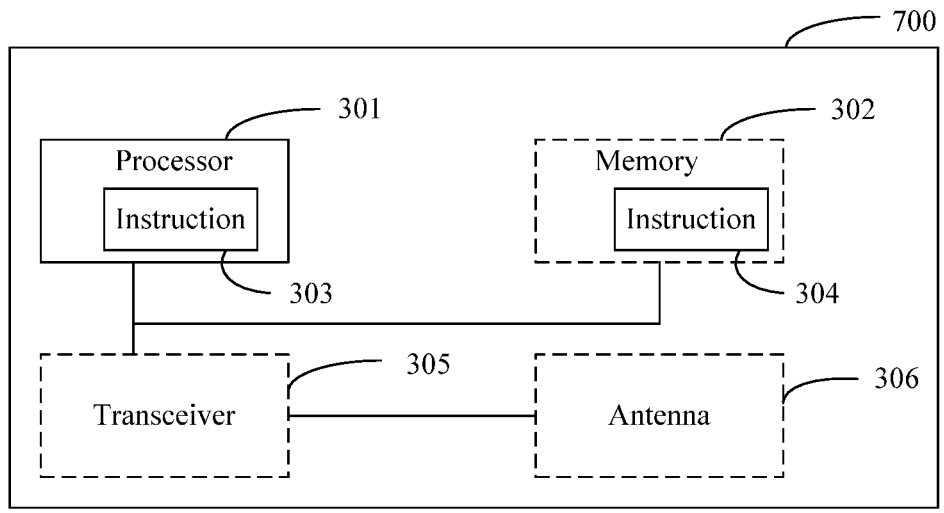

FIG. 3

| Write n physical resource block groups into an interleaving matrix row by row, where N null values are inserted into intersections between the first row and the last N columns of the interleaving matrix or intersections between the last row and the first N columns of the interleaving matrix, n is a positive integer, and N is a natural number | — 101 |

↓

| Read the n physical resource block groups from the interleaving matrix column by column, where the n read physical resource block groups are mapped to n virtual resource block groups | — 102 |

↓

| Determine, based on the n physical resource block groups mapped to the n virtual resource block groups, physical resource blocks mapped to virtual resource blocks in the n virtual resource block groups | — 103 |

FIG. 4

RESOURCE MAPPING METHOD AND DEVICE

CROSS-REFERENCE TO RELATED APPLICATIONS

This application is a continuation of International Application No. PCT/CN2019/071364, filed on Jan. 11, 2019, which claims priority to Chinese Patent Application No. 201810032421.0, filed on Jan. 12, 2018 and Chinese Patent Application No. 201810065051.0, filed on Jan. 23, 2018. All of the afore-mentioned patent applications are hereby incorporated by reference in their entireties.

TECHNICAL FIELD

Embodiments of this application relate to the field of communications technologies, and in particular, to a resource mapping method and a device.

BACKGROUND

In an air interface system, a resource is allocated based on a virtual resource block (VRB), but data is actually transmitted based on a physical resource block (PRB). Referring to FIG. 1, a terminal may determine, by using indication information transmitted on a downlink control channel, a VRB used to transmit data in a given transmission time unit, map data to the VRB, and then determine a correspondence between a VRB group and a PRB group through interleaving, to transmit the data on a PRB in the PRB group.

According to the foregoing practice, it may not be ensured that the data mapped to the VRB is correctly transmitted on the PRB.

SUMMARY

Embodiments of this application provide a resource mapping method and a device, to ensure that data mapped to a VRB is correctly transmitted on a PRB.

To achieve the foregoing objective, the following technical solutions are used in the embodiments of this application.

According to a first aspect, an embodiment of this application provides a resource mapping method. The method may include: writing, by a network device, n physical resource block groups into an interleaving matrix row by row, where N null values are inserted into intersections between the first row and the last N columns of the interleaving matrix or intersections between the last row and the first N columns of the interleaving matrix, n is a positive integer, and N is a natural number; next, reading, by the network device, the n physical resource block groups from the interleaving matrix column by column, where the n read physical resource block groups are mapped to n virtual resource block groups; and subsequently, determining, by the network device based on the n physical resource block groups mapped to the n virtual resource block groups, physical resource blocks mapped to virtual resource blocks in the n virtual resource block groups.

According to a second aspect, an embodiment of this application provides a resource mapping method. The method may include: writing, by a network device, n virtual resource block groups into an interleaving matrix column by column, where N null values are inserted into intersections between the first row and the last N columns of the interleaving matrix or intersections between the last row and the first N columns of the interleaving matrix, n is a positive integer, and N is a natural number; next, reading, by the network device, the n virtual resource block groups from the interleaving matrix row by row, where the n read virtual resource block groups are mapped to n physical resource block groups; and subsequently, determining, by the network device based on the n physical resource block groups mapped to the n virtual resource block groups, physical resource blocks mapped to virtual resource blocks in the n virtual resource block groups.

According to the first aspect or the second aspect, the network device may determine a virtual resource block group corresponding to a target physical resource block group, where the target physical resource block group is a physical resource block group including physical resource blocks whose quantity is less than L, so that the network device can map complex-valued symbols to virtual resource blocks that are in the virtual resource block group and whose quantity is the same as that of physical resource blocks in the target physical resource block group, thereby ensuring that the complex-valued symbols mapped to these virtual resource blocks in the virtual resource block group can be correctly transmitted on corresponding physical resource blocks in the target physical resource block group.

In a possible implementation of the first aspect or the second aspect, before the writing, by a network device, n physical resource block groups into an interleaving matrix row by row, or before the writing, by a network device, n virtual resource block groups into an interleaving matrix column by column, the method further includes: mapping, by the network device, a complex-valued symbol to a subset of the virtual resource blocks in the n virtual resource block groups. After the determining, by the network device, physical resource blocks mapped to virtual resource blocks in the n virtual resource block groups, the method further includes: transmitting, by the network device, the complex-valued symbol on a physical resource block corresponding to the subset of the virtual resource blocks in the n virtual resource block groups.

In this way, the network device can determine, without calculating interleaving in advance, the virtual resource block group corresponding to the target physical resource block group, so that the network device can map the complex-valued symbols to the virtual resource blocks that are in the virtual resource block group and whose quantity is the same as that of physical resource blocks in the target physical resource block group, thereby ensuring that the complex-valued symbols mapped to these virtual resource blocks in the virtual resource block group can be correctly transmitted on the corresponding physical resource blocks in the target physical resource block group.

With reference to the foregoing possible implementation, in another possible implementation of the first aspect or the second aspect, the n physical resource block groups form a carrier bandwidth part.

In this way, the network device can write all physical resource block groups included in the carrier bandwidth part into the interleaving matrix.

With reference to the foregoing possible implementations, in another possible implementation of the first aspect or the second aspect, a quantity of physical resource blocks included in a physical resource block group with a largest index in the n physical resource block groups is less than a reference value, and a quantity of virtual resource blocks included in a virtual resource block group with a largest index in the n virtual resource block groups is less than the reference value. Specifically, when a quantity of physical resource blocks included in the carrier bandwidth part is a non-integer multiple of the reference value, the quantity of physical resource blocks included in the physical resource block group with the largest index in the n physical resource block groups is less than the reference value, and the quantity of virtual resource blocks included in the virtual resource block group with the largest index in the n virtual resource block groups is less than the reference value.

With reference to the foregoing possible implementations, in another possible implementation of the first aspect or the second aspect, the n physical resource block groups are a proper subset of m physical resource block groups corresponding to the carrier bandwidth part, the n physical resource block groups include a physical resource block group with a largest index in the m physical resource block groups, and m is a positive integer greater than n.

In this way, the physical resource block group with the largest index in the carrier bandwidth part is written into the interleaving matrix, and the physical resource block group with the largest index is mapped to a virtual resource block group with a largest index in the carrier bandwidth part after interleaving.

With reference to the foregoing possible implementations, in another possible implementation of the first aspect or the second aspect, a row quantity of the interleaving matrix is 2, and N is 0 or 1.

In this way, no null value is inserted into the interleaving matrix, or one null value is inserted into the interleaving matrix.

With reference to the foregoing possible implementations, in another possible implementation of the first aspect or the second aspect, a virtual resource block group i is mapped to a physical resource block group j, where $j = rC + c - \Delta$ $i = cR + r$ $r = 0, 1, \ldots, R-1$ $c = 0, 1, \ldots, C-1$ $R = 2$ $\Delta = (r - \max\{c-1, 0\}(C-1)) \cdot N$, where R represents the row quantity of the interleaving matrix; C represents a column quantity of the interleaving matrix; N represents a quantity of null values; $C = \lceil N_{BWP}^{size}/(LR) \rceil$ and, $N = RC - \lceil N_{BWP}^{size}/L \rceil$, or $C = \lceil N_{BWP}^{bundle}/R \rceil$ and $N = RC - N_{BWP}^{bundle}$; $N_{BWP}^{size}$ represents a quantity of physical resource blocks included in the carrier bandwidth part; $N_{BWP}^{bundle}$ represents a quantity of virtual resource block groups and/or physical resource block groups in the carrier bandwidth part; L represents a reference value of a quantity of virtual resource blocks included in a virtual resource block group; $\lceil \, \rceil$ means rounding up; and max means obtaining a maximum value.

In this way, N null values are inserted into the last N columns in the first row of the interleaving matrix.

With reference to the foregoing possible implementations, in another possible implementation of the first aspect or the second aspect, a virtual resource block group i is mapped to a physical resource block group j, where $j = rC + c - \Delta$ $i = cR + r$ $r = 0, 1, \ldots, R-1$ $c = 0, 1, \ldots, C-1$ $R = 2$ $\Delta = (r-1) \cdot C \cdot N \cdot \lceil i/(RC) \rceil$, where R represents the row quantity of the interleaving matrix; C represents a column quantity of the interleaving matrix; N represents a quantity of null values; $C = \lceil N_{BWP}^{size}/(LR) \rceil$ and $N = RC - \lceil N_{BWP}^{size}/L \rceil$, $C = \lceil N_{BWP}^{bundle}/R \rceil$ and $N = RC - N_{BWP}^{size}$; $N_{BWP}^{size}$ represents a quantity of physical resource blocks included in the carrier bandwidth part; $N_{BWP}^{bundle}$ represents a quantity of virtual resource block groups and/or physical resource block groups in the carrier bandwidth part; L represents a reference value of a quantity of physical resource blocks included in a virtual resource block group; and $\lceil \, \rceil$ means rounding up.

In this way, N null values are inserted to the first N columns in the last row of the interleaving matrix.

With reference to the foregoing possible implementations, in another possible implementation of the first aspect or the second aspect, before the mapping, by the network device, a complex-valued symbol to a subset of the virtual resource blocks in the n virtual resource block groups, the method further includes: receiving, by the network device, the carrier bandwidth part and allocated virtual resource blocks in the carrier bandwidth part, where the carrier bandwidth part and the allocated virtual resource blocks in the carrier bandwidth part are sent by another network device.

In this way, the network device can perform resource mapping based on the received carrier bandwidth part and the received virtual resource blocks allocated in the carrier bandwidth part.

With reference to the foregoing possible implementations, in another possible implementation of the first aspect or the second aspect, before the writing, by a network device, n physical resource block groups into an interleaving matrix row by row, or before the writing, by a network device, n virtual resource block groups into an interleaving matrix column by column, the network device may further receive the reference value sent by the another network device, where the reference value is a reference quantity of resource blocks included in a resource block group, so that the network device determines the column quantity of the interleaving matrix based on the reference value, to write the n physical resource block groups into the interleaving matrix row by row or write the n virtual resource block groups into the interleaving matrix column by column.

With reference to the foregoing possible implementations, in a possible implementation, the n physical resource block groups form the carrier bandwidth part, and the interleaving matrix is $$\begin{bmatrix} 0 & 1 & \ldots & C-2 & 2C-2 \\ C & C+1 & \ldots & C-1 & * \end{bmatrix},$$

where $n = \lceil N_{BWP}^{size}/L \rceil$ and $C = \lceil N_{BWP}^{size}/(LR) \rceil$, $n = N_{BWP}^{bundle}$ and $C = \lceil N_{BWP}^{bundle}/R \rceil$; $N_{BWP}^{size}$ represents a quantity of physical resource blocks included in the carrier bandwidth part; $N_{BWP}^{bundle}$ represents a quantity of virtual resource block groups and/or physical resource block groups in the carrier bandwidth part; L represents a reference value of a quantity of physical resource blocks included in a physical resource block group; C represents a column quantity of the interleaving matrix; and R represents a row quantity of the interleaving matrix. The network device reads the n physical resource block groups from the interleaving matrix column by column, where the n read physical resource block groups correspond to the n virtual resource block groups. Subsequently, the network device determines, based on the n physical resource block groups mapped to the n virtual resource block groups, the physical resource blocks mapped to the virtual resource blocks in the n virtual resource block groups. In this way, regardless of whether the target physical resource block group is a physical resource block group with a smallest index or a physical resource block group with a largest index in the carrier bandwidth part, the network device can determine, without calculating interleaving in advance, the virtual resource block group corresponding to the target physical resource block group, so that the network device can map the complex-valued symbols to the virtual resource blocks that are in the virtual resource block group and whose quantity is the same as that of physical resource blocks in the target physical resource block group, thereby ensuring that the complex-valued symbols mapped to these virtual resource blocks in the virtual resource block group can be correctly transmitted on the corresponding physical resource blocks in the target physical resource block group.

According to a third aspect, an embodiment of this application provides a resource mapping method, including: mapping, by a network device, virtual resource blocks in n virtual resource block groups to physical resource blocks; and when at least one of the virtual resource blocks corresponds to a resource block that is not in a carrier bandwidth part, remapping, to another physical resource block in the carrier bandwidth part, the virtual resource block that corresponds to the resource block that is not in the carrier bandwidth part.

In this way, each virtual resource block can be mapped to a physical resource block in the carrier bandwidth part, so that a complex-valued symbol on the virtual resource block can be correctly transmitted on the physical resource block.

According to a fourth aspect, an embodiment of this application provides a resource mapping method, including: determining, by a network device through interleaving, a mapping relationship between a virtual resource block group and a physical resource block group; and mapping, by the network device, a complex-valued symbol to a virtual resource block based on the mapping relationship between a virtual resource block group and a physical resource block group.

In a possible implementation of the fourth aspect, the network device determines, based on the mapping relationship between a virtual resource block group and a physical resource block group, a first virtual resource block in allocated virtual resource blocks, and a terminal maps a complex-valued symbol to a virtual resource block other than the first virtual resource block in the allocated virtual resource blocks, where a virtual resource block group corresponding to the first virtual resource block is mapped to a physical resource block group with a largest index in a carrier bandwidth part.

In another possible implementation of the fourth aspect, a terminal determines a first virtual resource block in allocated virtual resource blocks, and the terminal remaps a complex-valued symbol on the first virtual resource block to a second virtual resource block, where a virtual resource block group corresponding to the first virtual resource block is mapped to a physical resource block group with a largest index in a carrier bandwidth part.

In this way, a quantity of resource blocks included in a virtual resource block group including a virtual resource block to which a complex-valued symbol is mapped can match a quantity of resource blocks included in a corresponding physical resource block group, thereby ensuring that the complex-valued symbol on the virtual resource block can be correctly transmitted on a physical resource block.

According to a fifth aspect, an embodiment of this application provides an apparatus, including: a write unit, configured to: write n physical resource block groups into an interleaving matrix row by row, or write n virtual resource block groups into an interleaving matrix column by column, where N null values are inserted into intersections between the first row and the last N columns of the interleaving matrix or intersections between the last row and the first N columns of the interleaving matrix, n is a positive integer, and N is a natural number; a read unit, configured to: read the n physical resource block groups from the interleaving matrix column by column, or read the n virtual resource block groups from the interleaving matrix column by row, where the n read physical resource block groups are mapped to n virtual resource block groups, or the n read virtual resource block groups are mapped to n physical resource block groups; and a determining unit, configured to determine, based on the n physical resource block groups mapped to the n virtual resource block groups, physical resource blocks mapped to virtual resource blocks in the n virtual resource block groups.

In a possible implementation of the fifth aspect, the apparatus further includes: a mapping unit, configured to: before the write unit writes the n physical resource block groups into the interleaving matrix row by row or writes the n virtual resource block groups into the interleaving matrix column by column, map a complex-valued symbol to a subset of the virtual resource blocks in the n virtual resource block groups; and a transmission unit, configured to: after the determining unit determines the physical resource blocks mapped to the virtual resource blocks in the n virtual resource block groups, transmit the complex-valued symbol on a physical resource block corresponding to the subset of the virtual resource blocks in the n virtual resource block groups.

With reference to the foregoing possible implementation, in another possible implementation of the fifth aspect, the n physical resource block groups form a carrier bandwidth part.

With reference to the foregoing possible implementations, in another possible implementation of the fifth aspect, when a quantity of physical resource blocks included in the carrier bandwidth part is a non-integer multiple of a reference value, a quantity of physical resource blocks included in a physical resource block group with a largest index in the n physical resource block groups is less than the reference value, and a quantity of virtual resource blocks included in a virtual resource block group with a largest index in the n virtual resource block groups is less than the reference value.

With reference to the foregoing possible implementations, in another possible implementation of the fifth aspect, the n physical resource block groups are a proper subset of m physical resource block groups corresponding to the carrier bandwidth part, and the n physical resource block groups include a physical resource block group with a largest index in the m physical resource block groups.

With reference to the foregoing possible implementations, in another possible implementation of the fifth aspect, a row quantity of the interleaving matrix is 2, and N is 0 or 1.

With reference to the foregoing possible implementations, in another possible implementation of the fifth aspect, a virtual resource block group i is mapped to a physical resource block group j, where $$j = \begin{cases} cR+r, & i = \lceil N_{BWP}^{size}/L \rceil - 1 \text{ and } N > 0 \\ r(C+(-1)^N)+c, & \text{other values} \end{cases}$$

$i = cR + r$ $r = 0, 1, \ldots, R-1$, where $c = 0, 1, \ldots, C-1$ $R = 2$

R represents the row quantity of the interleaving matrix; C represents a column quantity of the interleaving matrix; N represents a quantity of null values; $C = \lceil N_{BWP}^{size}/(LR) \rceil$ and $N = RC - \lceil N_{BWP}^{size}/L \rceil$, or $C = \lceil N_{BWP}^{bundle}/R \rceil$ and $N = RC - N_{BWP}^{size}$; $N_{BWP}^{size}$ represents a quantity of physical resource blocks included in the carrier bandwidth part; N W P represents a quantity of virtual resource block groups and/or physical resource block groups in the carrier bandwidth part; and L represents a reference value of a quantity of physical resource blocks included in a virtual resource block group.

With reference to the foregoing possible implementations, in another possible implementation of the fifth aspect, a virtual resource block group i is mapped to a physical resource block group j, where $$j = \begin{cases} r(R-C)+c+(C-1), & i \neq 0 \text{ and } N > 0 \\ rC+c, & \text{other values} \end{cases}$$

$i = cR + r$ $r = 0, 1, \ldots, R-1$, where $c = 0, 1, \ldots, C-1$ $R = 2$

R represents the row quantity of the interleaving matrix; C represents a column quantity of the interleaving matrix; N represents a quantity of null values; $C = \lceil N_{BWP}^{size}/(LR) \rceil$ and $N = RC - \lceil N_{BWP}^{size}/L \rceil$, or $C = \lceil N_{BWP}^{bundle}/R \rceil$ and $N = RC - N_{BWP}^{size}$; $N_{BWP}^{size}$ represents a quantity of physical resource blocks included in the carrier bandwidth part; N W P represents a quantity of virtual resource block groups and/or physical resource block groups in the carrier bandwidth part; and L represents a reference value of a quantity of physical resource blocks included in a virtual resource block group.

With reference to the foregoing possible implementations, in another possible implementation of the fifth aspect, the apparatus further includes: a receiving unit, configured to: before the mapping unit maps the complex-valued symbol to the subset of the virtual resource blocks in the n virtual resource block groups, receive the carrier bandwidth part and allocated virtual resource blocks in the carrier bandwidth part, where the carrier bandwidth part and the allocated virtual resource blocks in the carrier bandwidth part are sent by another network device.

According to a sixth aspect, an embodiment of this application provides an apparatus, including: a write unit, configured to write n physical resource block groups into an interleaving matrix row by row, where the n physical resource block groups form a carrier bandwidth part; the interleaving matrix is $$\begin{bmatrix} 0 & 1 & \ldots & C-2 & 2C-2 \\ C & C+1 & \ldots & C-1 & * \end{bmatrix};$$

$n = \lceil N_{BWP}^{size}/L \rceil$ and $C = \lceil N_{BWP}^{size}/(LR) \rceil$, or $n = N_{BWP}^{bundle}$ and $C = \lceil N_{BWP}^{bundle}/R \rceil$; $N_{BWP}^{size}$ represents a quantity of physical resource blocks included in the carrier bandwidth part; $N_{BWP}^{bundle}$ represents a quantity of virtual resource block groups and/or physical resource block groups in the carrier bandwidth part; L represents a reference value of a quantity of physical resource blocks included in a physical resource block group; C represents a column quantity of the interleaving matrix; and R represents a row quantity of the interleaving matrix, where a network device reads the n physical resource block groups from the interleaving matrix column by column, to obtain n physical resource block groups to which n virtual resource block groups are mapped after interleaving; a read unit, configured to read the n physical resource block groups from the interleaving matrix column by column, where the n read physical resource block groups correspond to n virtual resource block groups; and a determining unit, configured to determine, based on the n physical resource block groups mapped to the n virtual resource block groups, physical resource blocks mapped to virtual resource blocks in the n virtual resource block groups.

According to a seventh aspect, an embodiment of this application provides an apparatus, including: a first mapping unit, configured to map virtual resource blocks in n virtual resource block groups to physical resource blocks; and a second mapping unit, configured to: when at least one of the virtual resource blocks corresponds to a resource block that is not in a carrier bandwidth part, remap, to another physical resource block in the carrier bandwidth part, the virtual resource block that corresponds to the resource block that is not in the carrier bandwidth part.

According to an eighth aspect, an embodiment of this application provides an apparatus, including: a determining unit, configured to determine, through interleaving, a mapping relationship between a virtual resource block group and a physical resource block group; and a mapping unit, configured to map a complex-valued symbol to a virtual resource block based on the mapping relationship between a virtual resource block group and a physical resource block group.

In a possible implementation of the eighth aspect, a network device determines, based on the mapping relationship between a virtual resource block group and a physical resource block group, a first virtual resource block in allocated virtual resource blocks, and a terminal maps a complex-valued symbol to a virtual resource block other than the first virtual resource block in the allocated virtual resource blocks, where a virtual resource block group corresponding to the first virtual resource block is mapped to a physical resource block group with a largest index in a carrier bandwidth part.

In another possible implementation of the eighth aspect, a terminal determines a first virtual resource block in allocated virtual resource blocks, and the terminal remaps a complex-valued symbol on the first virtual resource block to a second virtual resource block, where a virtual resource block group corresponding to the first virtual resource block is mapped to a physical resource block group with a largest index in a carrier bandwidth part.

According to a ninth aspect, an embodiment of this application provides an apparatus, including at least one processor and at least one memory, where the processor is configured to perform the resource mapping method in any one of the first aspect to the fourth aspect, and the memory is coupled to the processor.

According to a tenth aspect, an embodiment of this application provides an apparatus, including at least one processor and at least one memory, where the at least one memory is coupled to the at least one processor, the at least one memory is configured to store computer program code, the computer program code includes a computer instruction, and when the one or more processors execute the computer instruction, the apparatus performs the resource mapping method in any one of the first aspect to the fourth aspect.

According to an eleventh aspect, an embodiment of this application provides an apparatus, including at least one processor, where the processor is configured to perform the resource mapping method in any one of the first aspect to the fourth aspect.

According to a twelfth aspect, an embodiment of this application provides a computer storage medium, including a computer instruction, where when the computer instruction is run on a network device, the network device is enabled to perform the resource mapping method in any one of the first aspect to the fourth aspect.

According to a thirteenth aspect, an embodiment of this application provides a computer program product, where when the computer program product is run on a computer, the computer is enabled to perform the resource mapping method in any one of the first aspect to the fourth aspect.

According to a fourteenth aspect, an embodiment of this application provides a chip, where the chip exists in a form of an apparatus, and the chip may be any apparatus in the fifth aspect to the thirteenth aspect.

For beneficial effects corresponding to the fifth aspect to the fourteenth aspect, refer to the related descriptions of the beneficial effects of the first aspect to the fourth aspect. Details are not described herein again.

BRIEF DESCRIPTION OF THE DRAWINGS

FIG. 3 is a schematic structural diagram of a communications apparatus according to an embodiment of this application;

FIG. 4 is a flowchart of a resource mapping method according to an embodiment of this application;

DETAILED DESCRIPTION OF ILLUSTRATIVE EMBODIMENTS

For ease of understanding, descriptions of some concepts related to the embodiments of this application are provided for reference as follows by using an example:

A system frequency resource is a frequency resource managed and allocated by a base station, or may be a frequency resource used for communication between a base station and a terminal. In the embodiments of this application, the system frequency resource may be also referred to as a carrier resource, a system resource, or a transmission resource. In terms of frequency, a width of the system frequency resource may be referred to as a bandwidth of the system frequency resource, and may be also referred to as a carrier bandwidth, a system bandwidth, or a transmission bandwidth.

A carrier bandwidth part is a part or all of a system carrier. Configurations of the carrier bandwidth part include a frequency start resource block, a bandwidth (bandwidth, BW), and a corresponding parameter (numerology) that are of the carrier bandwidth part. The bandwidth is a quantity of RBs included in the carrier bandwidth part, and the parameter includes at least one of a subcarrier spacing or a cyclic prefix (cyclic prefix, CP).

Figure 1:
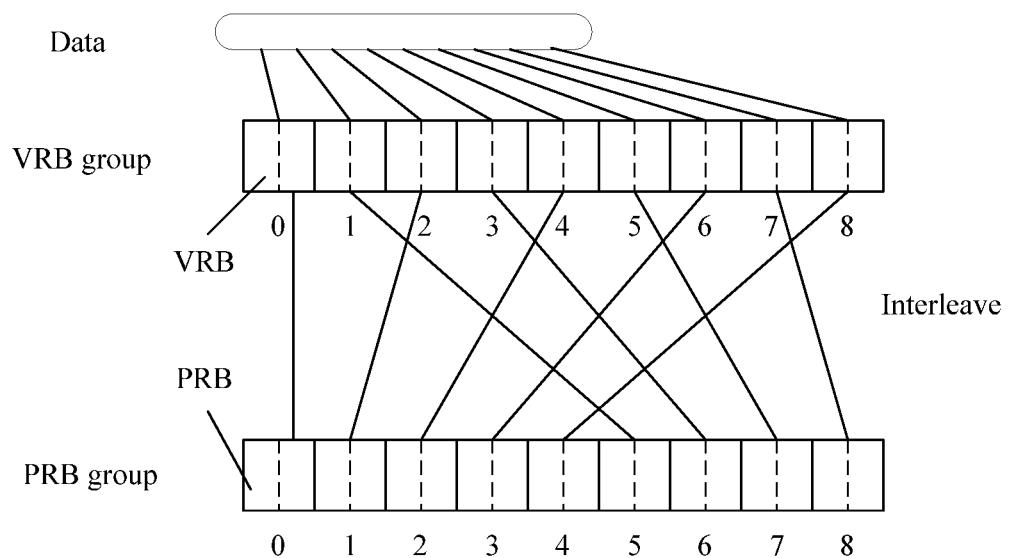
FIG. 1 is a schematic diagram of a resource mapping method in the current system.
Figure 2:
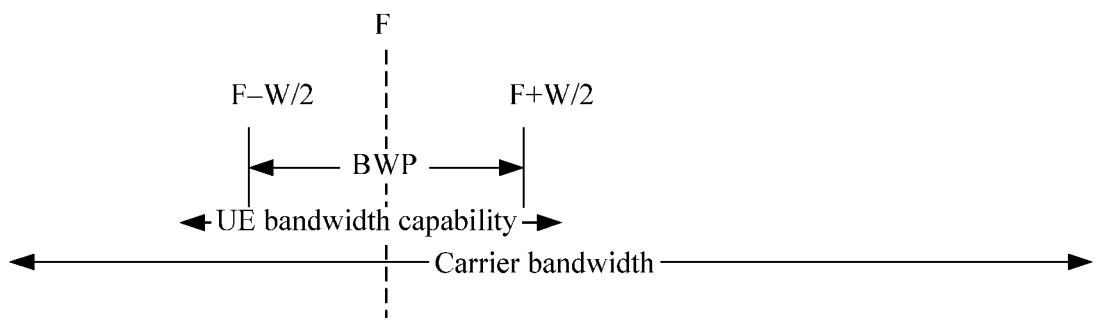
FIG. 2 is a schematic diagram of a carrier bandwidth part according to an embodiment of this application.

For example, FIG. 2 is a schematic configuration diagram of the frequency start RB and the bandwidth that are of the carrier bandwidth part. As shown in FIG. 2, the carrier bandwidth part may be some or all resources within a carrier (carrier) bandwidth, the bandwidth of the carrier bandwidth part is W, and a frequency of a center frequency channel number is F. Frequencies at boundary points of the carrier bandwidth part are respectively F W/2 and F+W/2. This may also be described as follows: A frequency of a highest frequency channel number of the carrier bandwidth part is F+W/2, and a frequency of a lowest frequency channel number of the carrier bandwidth part is F−W/2.

The numerology is a parameter used in a communications system. The communications system (for example, 5G) may support a plurality of numerologies. The numerology may be defined by using one or more pieces of the following parameter information: the subcarrier spacing, the cyclic prefix (cyclic prefix, CP), a time unit, a bandwidth, and the like. For example, the numerology may be defined by using the subcarrier spacing and the CP.

The subcarrier spacing may be an integer greater than or equal to 0. For example, the subcarrier spacing may be 15 kHz, 30 kHz, 60 kHz, 120 kHz, 240 kHz, or 480 kHz. For example, different subcarrier spacings may be integer multiples of 2. It may be understood that the subcarrier spacing may alternatively be designed to be another value.

Information about the CP may include a length of the CP and/or a type of the CP. For example, the CP may be a normal CP (normal CP, NCP) or an extended CP (extended CP, ECP).

The time unit is used to represent a time unit in time domain, for example, may be a sampling point, a symbol, a mini-slot, a slot, a subframe, or a radio frame. Information about the time unit may include a type, a length, a structure, or the like of the time unit.

The bandwidth (bandwidth) may be a segment of contiguous resources in terms of frequency. The bandwidth sometimes may be referred to as a bandwidth part (bandwidth part, BWP), a carrier bandwidth part (carrier bandwidth part), a subband (subband) bandwidth, a narrowband (narrowband) bandwidth, or another name. The name is not limited in this application. For example, one BWP includes K (K>0) contiguous subcarriers; or one BWP is a frequency resource including N non-overlapping contiguous resource blocks (resource block, RB), where a subcarrier spacing of the RB may be 15 kHz, 30 kHz, 60 kHz, 120 kHz, 240 kHz, 480 kHz, or another value; or one BWP is a frequency resource including M non-overlapping contiguous resource block groups (resource block group, RBG), where one RBG includes P contiguous RBs, and a subcarrier spacing of the RB may be 15 kHz, 30 kHz, 60 kHz, 120 kHz, 240 kHz, 480 kHz, or another value, for example, an integer multiple of 2.

The following describes the technical solutions in the embodiments of this application with reference to the accompanying drawings in the embodiments of this application. In descriptions of the embodiments of this application, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more than two.

It should be noted that in the embodiments of this application, a virtual resource block VRB and a physical resource block PRB may be collectively referred to as a resource block (resource block, RB), and a virtual resource block group (VRB group) and a physical resource block group (PRB group) may be collectively referred to as a resource block group (RB group).

The embodiments of this application relate to resource allocation and data transmission in the carrier bandwidth part. In the following descriptions, unless otherwise specified, transmission may mean uplink sending, or may mean downlink receiving.

A network device in the embodiments of this application may be a network device that performs data transmission in a communications system. For example, the network device may be a terminal, and may be specifically user equipment (user equipment, UE), an access terminal, a terminal unit, a terminal station, a mobile station, a mobile console, a remote station, a remote terminal, a mobile device, a wireless communications device, a terminal agent, a terminal apparatus, or the like. The access terminal may be a cellular phone, a cordless phone, a session initiation protocol (SIP) phone, a wireless local loop (wireless local loop, WLL) station, a personal digital assistant (PDA), a handheld device or a computing device having a wireless communication function, another processing device connected to a wireless modem, a vehicle-mounted device, a wearable device, a terminal in a 5G network, a terminal in a future evolved PLMN network, or the like.

For another example, the network device may be a base station, a relay node, or an access point. The base station may be a base transceiver station (BTS) in a global system for mobile communications (GSM) or code division multiple access (CDMA) network, or may be an NB (NodeB) in wideband code division multiple access (WCDMA), or may be an eNB or an eNodeB (evolutional NodeB) in LTE. The network device may alternatively be a radio controller in a cloud radio access network (CRAN) scenario. The network device may alternatively be a gNB in a 5G network, a network device in a future evolved PLMN network, or the like.

For example, FIG. 3 is a schematic structural diagram of a communications apparatus 300. The communications apparatus 300 may be the network device in the embodiments of this application, and may be specifically a chip, a base station, a terminal, or another network device.

The communications apparatus 300 includes one or more processors 301. The processor 301 may be a general-purpose processor, a dedicated processor, or the like, for example, may be a baseband processor or a central processing unit. The baseband processor may be configured to process a communication protocol and communication data. The central processing unit may be configured to: control a communications apparatus (for example, a base station, a terminal, or a chip), execute a software program, and process data of the software program.

In a possible design, the network device may include one or more modules. The one or more modules may be implemented by one or more processors, or may be implemented by one or more processors and one or more memories.

In a possible design, the communications apparatus 300 includes the one or more processors 301. The one or more processors 301 can implement an interleaving function and a mapping function. In another possible design, the processor 301 can implement another function in addition to the interleaving function and the mapping function.

Optionally, in a design, the processor 301 may include an instruction 303 (which sometimes may be also referred to as code or a program). The instruction may be run on the processor, to enable the communications apparatus 300 to perform the method described in the foregoing embodiment. In another possible design, the communications apparatus 300 may alternatively include a circuit. The circuit can implement the interleaving function, the modulation function, and another function in the foregoing embodiment.

Optionally, in a design, the communications apparatus 300 may include one or more memories 302 that store an instruction 304. The instruction may be run on the processor, to enable the communications apparatus 300 to perform the method described in the foregoing method embodiment.

Optionally, the memory may further store data. Optionally, the processor may also store an instruction and/or data. The processor and the memory may be separately disposed, or may be integrated together.

Optionally, the communications apparatus 300 may further include a transceiver 305 and an antenna 306. The processor 301 may be referred to as a processing unit, and controls the communications apparatus (a terminal or a base station). The transceiver 505 may be referred to as a transceiver unit, a transceiver, a transceiver circuit, a transceiver, or the like, and is configured to implement receiving and sending functions of the communications apparatus by using the antenna 306.

Optionally, the communications apparatus 300 may further include an interleaver for interleaving, a modulator for modulation processing, or the like. Functions of these components can be implemented by the one or more processors 301.

Optionally, the communications apparatus 300 may further include a demodulator for a demodulation operation, a de-interleaver for de-interleaving, or the like. Functions of these components can be implemented by the one or more processors 301.

In new radio (new radio, NR) of 5th generation mobile communications (the 5th generation, 5G), transmitting data between a base station and a terminal by using two steps of resource allocation is discussed and supported. To be specific, the base station first indicates a carrier bandwidth part (bandwidth part, BWP) to the terminal, and then allocates a resource in the carrier bandwidth part to the UE and transmits data by using the resource. Specifically, the UE and the base station each may map a complex-valued symbol to a VRB in the carrier bandwidth part, and transmit the complex-valued symbol on a PRB corresponding to the VRB.

For example, when the terminal is UE, the two steps of resource allocation may be applied to the following three scenarios that impose no limitation, and the base station may allocate a carrier bandwidth part to the UE, so that the UE transmits data by using a resource in the carrier bandwidth part.

Scenario 1: High-Bandwidth Scenario

In a communications system, as a service volume of the UE and a quantity of UEs increase, a system service volume significantly increases. Therefore, a design in which a system bandwidth is a high bandwidth is proposed in an existing communications system, to provide more system resources, thereby providing a relatively high data transmission rate. In the communications system in which the system bandwidth is a high bandwidth, considering costs of the UE and the service volume of the UE, a bandwidth supported by the UE may be less than the system bandwidth. If the bandwidth supported by the UE is higher, a processing capability of the UE is stronger, a data transmission rate of the UE may be higher, and design costs of the UE may be higher. The bandwidth supported by the UE may be also referred to as a bandwidth capability of the UE, and the carrier bandwidth part is within the bandwidth capability of the UE. For example, in a 5G system, a maximum system bandwidth may be 400 MHz, and the bandwidth capability of the UE may be 20 MHz, 50 MHz, 100 MHz, or the like. In a wireless communications system, bandwidth capabilities of different UEs may be the same or different. This is not limited in the embodiments of this application.

In the communications systems in which the system bandwidth is a high bandwidth, because the bandwidth capability of the UE is less than the system bandwidth, the base station may configure a carrier bandwidth part for the UE from a system frequency resource. For example, a bandwidth of the carrier bandwidth part is less than or equal to the bandwidth capability of the UE. When communication is performed between the UE and the base station, the base station may allocate, to the UE for the communication between the base station and the UE, some or all resources in the carrier bandwidth part configured for the UE.

Scenario 2: Multi-Parameter Scenario

In a wireless communications system, for example, in a 5G system, to support more service types and/or communications scenarios, a design in which a plurality of parameters are supported is proposed. Parameters may be independently set for different service types and/or communications scenarios.

In a possible configuration, the base station may configure a plurality of carrier bandwidth parts on a system frequency resource, and independently configure a parameter for each of the plurality of carrier bandwidth parts, to support a plurality of service types and/or communications scenarios on the system frequency resource. Numerologies of different carrier bandwidth parts may be the same or different. This is not limited in this application.

When communication is performed between the UE and the base station, the base station may determine, based on a service type and/or a communications scenario that are/is corresponding to the communication, a numerology A used for the communication, to configure a corresponding carrier bandwidth part for the UE based on the numerology A. A numerology of the corresponding carrier bandwidth part is configured as the numerology A. When communication is performed between the UE and the base station, the base station may allocate, to the UE for the communication between the base station and the UE, some or all resources in the carrier bandwidth part configured for the UE.

Scenario 3: Bandwidth Fallback Scenario

When communication is performed between the UE and the base station, the base station may configure a carrier bandwidth part for the UE based on a service volume of the UE, to reduce power consumption of the UE. For example, if the UE has no service, the UE may receive control information only in a relatively small carrier bandwidth part, to reduce a quantity of radio frequency processing tasks and a quantity of baseband processing tasks of the UE, thereby reducing the power consumption of the UE. If the UE has a relatively small service volume, the base station may configure a carrier bandwidth part with a relatively low bandwidth for the UE, to reduce a quantity of radio frequency processing tasks and a quantity of baseband processing tasks of the UE, thereby reducing the power consumption of the UE. If the UE has a relatively large service volume, the base station may configure a carrier bandwidth part with a relatively high bandwidth for the UE, to provide a higher data transmission rate. When communication is performed between the UE and the base station, the base station may allocate, to the UE for the communication between the base station and the UE, some or all resources in the carrier bandwidth part configured for the UE.

For example, the carrier bandwidth part may be a downlink carrier bandwidth part used by the UE to perform downlink receiving. In this case, a bandwidth of the carrier bandwidth part does not exceed a receiving bandwidth capability of the UE. Alternatively, the carrier bandwidth part may be an uplink carrier bandwidth part used by the UE to perform uplink sending. In this case, a bandwidth of the carrier bandwidth part does not exceed a sending bandwidth capability of the UE.

When wireless communication is performed between the base station and the UE by using a carrier bandwidth part, the base station manages the system frequency resource, and allocates a carrier bandwidth part from the system frequency resource to the UE, so that communication can be performed between the base station and the UE by using the allocated carrier bandwidth part.

The carrier bandwidth part is a self-contained structure, that is, the UE does not expect to perform downlink receiving outside the downlink carrier bandwidth part, and does not expect to perform uplink sending outside the uplink carrier bandwidth part.

It should be noted that mutual reference may be made to the related parameters in the foregoing three scenarios. Details are not described one by one herein.

In a resource mapping solution provided in the current system, a correspondence between a VRB group and a PRB group is determined through interleaving, to transmit data on a PRB in the PRB group. Consequently, it may not be ensured that data mapped to a VRB is correctly transmitted on a PRB. However, in a resource mapping solution provided in the embodiments of this application, it can be ensured that data mapped to a VRB is correctly transmitted on a PRB. The resource mapping solution provided in this application is described in detail below by using a detailed embodiment.

Referring to FIG. 4, an embodiment of this application provides a resource mapping method. The method may include the following steps.

101. A network device writes n physical resource block groups into an interleaving matrix row by row, where N null values are inserted into intersections between the first row and the last N columns of the interleaving matrix or intersections between the last row and the first N columns of the interleaving matrix, n is a positive integer, and N is a natural number.

A row quantity R of the interleaving matrix may be learned of based on a protocol or from another device, for example, R may be 2. A column quantity C of the interleaving matrix may be obtained through calculation based on a quantity $N_{BWP}^{size}$ of RBs included in a BWP, a quantity $N_{BWP}^{bundle}$ of virtual resource block groups and/or physical resource block groups in the BWP, the row quantity R of the interleaving matrix, and a reference value L, that is, $C=\lceil N_{BWP}^{size}/(LR)\rceil$ or $C=\lceil N_{BWP}^{bundle}/R\rceil$, where $\lceil \ \rceil$ means rounding up. The interleaving matrix has a total of R×C elements.

In this embodiment of this application, N null values are inserted into the last N columns in the first row of the interleaving matrix, or N null values are inserted into the first N columns in the last row of the interleaving matrix. The first N columns of the interleaving matrix include the first column of the interleaving matrix and N−1 columns that are sequentially incremented backwards. The last N columns of the interleaving matrix include the last column of the interleaving matrix and N−1 columns that are sequentially decremented forwards. Inserting a null value into the interleaving matrix may mean writing the null value, a null character, or a null element; or may mean performing no insertion, no write, or no read; or may mean skipping the null value when a physical resource block group is written and read.

Figure 5:
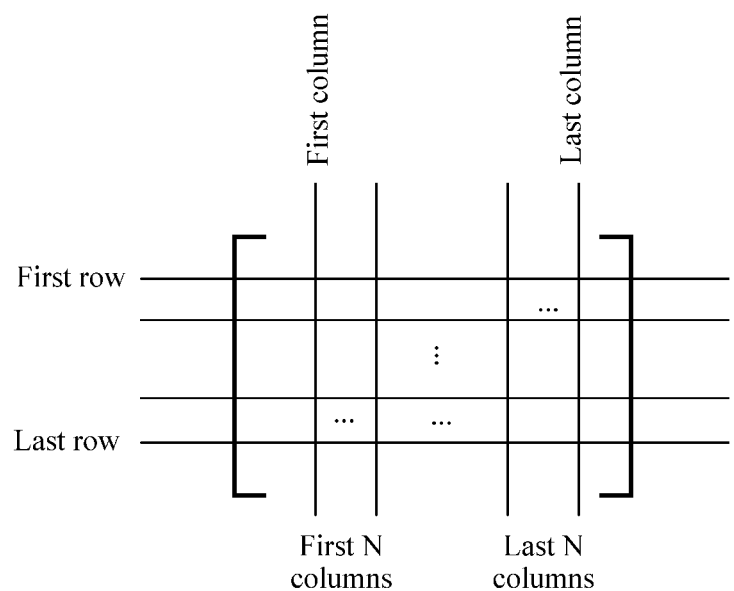
FIG. 5 is a schematic diagram of an interleaving matrix according to an embodiment of this application.

An $i^{th}$ (i is a positive integer) row of the interleaving matrix is obtained through sorting in a top-to-bottom order of rows of the interleaving matrix. Referring to FIG. 5, the first row is the topmost row of an interleaving matrix, and the last row is the lowermost row of the interleaving matrix. An $i^{th}$ (i is a positive integer) column of the interleaving matrix is obtained through sorting in a left-to-right order of columns of the interleaving matrix. Referring to FIG. 5, the first N columns of the interleaving matrix are the leftmost N columns including the leftmost first column, and the last N columns of the interleaving matrix are the rightmost N columns including the rightmost column.

Figure 6:
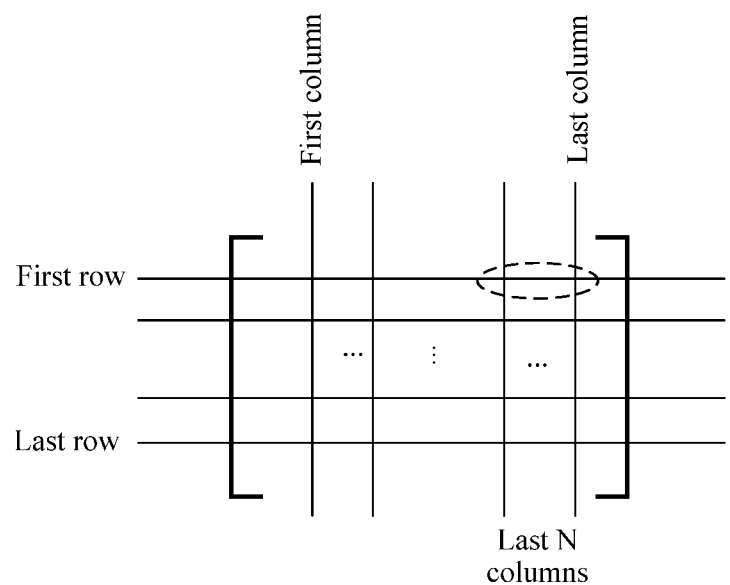
FIG. 6 is a schematic diagram of another interleaving matrix according to an embodiment of this application.
Figure 7:
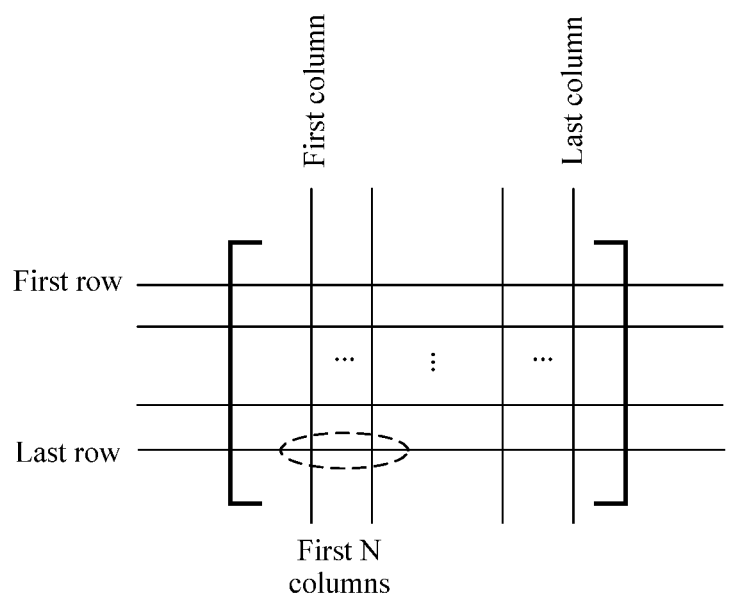
FIG. 7 is a schematic diagram of another interleaving matrix according to an embodiment of this application.

For example, the intersections between the first row and the last N columns of the interleaving matrix are located in an ellipse shown in FIG. 6. A null value is inserted into each of locations of the intersections between the row and the columns in the ellipse, and the null value is represented by *. The intersections between the last row and the first N columns of the interleaving matrix are located in an ellipse shown in FIG. 7. A null value is inserted into each of locations of the intersections between the row and the columns in the ellipse, and the null value is represented by *.

Figure 8:
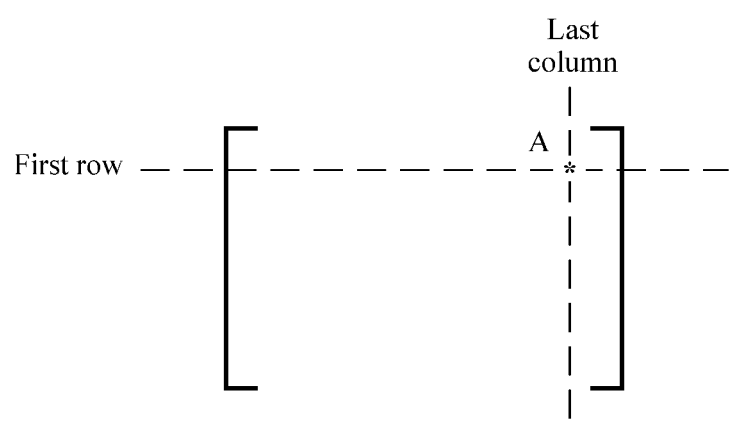
FIG. 8 is a schematic diagram of another interleaving matrix according to an embodiment of this application.
Figure 9:
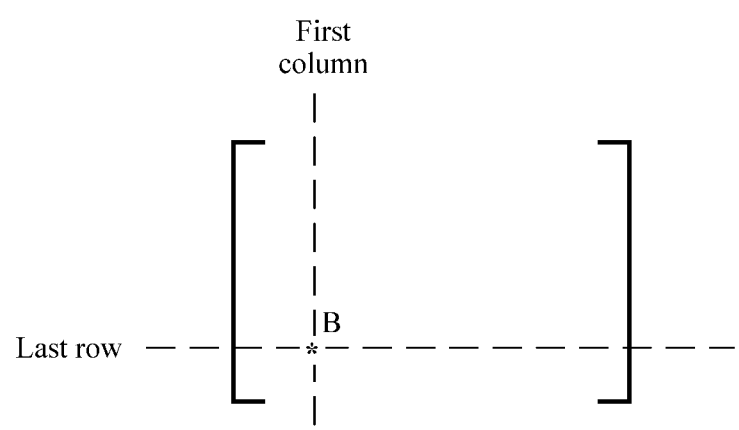
FIG. 9 is a schematic diagram of another interleaving matrix according to an embodiment of this application.

For example, when N is 1, the intersection between the first row and the last N columns of the interleaving matrix is an intersection between the first row and the last column, where the intersection is at a location A shown in FIG. 8, a null value is inserted into the location A, and the null value is represented by *. When N is 1, the intersection between the last row and the first N columns of the interleaving matrix is an intersection between the last row and the first column, where the intersection is at a location B shown in FIG. 9, a null value is inserted into the location B, and the null value is represented by *.

Writing the n physical resource block groups row by row means writing the n physical resource block groups into the rows of the interleaving matrix in the top-to-bottom order of the rows of the interleaving matrix and in a left-to-right order of columns in each row of the interleaving matrix. When the physical resource block groups are written into the interleaving matrix and a null value in the interleaving matrix is encountered, a location of the null value is skipped, and no physical resource block group is written into the location of the null value.

Specifically, the network device may write the n physical resource block groups into the interleaving matrix row by row in ascending order of indexes of the physical resource block groups. To be specific, the network device may write the n physical resource block groups into the rows of the interleaving matrix row by row in ascending order of the indexes of the physical resource block groups, in the top-to-bottom order of the rows of the interleaving matrix, and in the left-to-right order of the columns in each row of the interleaving matrix.

Indexes of physical resource blocks in a physical resource block group may be sorted in ascending order of frequencies corresponding to the physical resource blocks or in descending order of frequencies corresponding to the physical resource blocks. Indexes of virtual resource blocks in a virtual resource block group may be sorted in ascending order of frequencies corresponding to the virtual resource blocks or in descending order of frequencies corresponding to the virtual resource blocks.

For example, the column quantity of the interleaving matrix is C=3 if the row quantity of the interleaving matrix is R=2, a carrier bandwidth part includes nine VRBs with indexes 0 to 8, the reference value L=2, indexes of VRB groups are 0 to 4, the carrier bandwidth part includes nine PRBs with indexes 0 to 8, and indexes of PRB groups are 0 to 4. When the n physical resource block groups include physical resource block groups 0 to 4, if the interleaving matrix is in a form shown in FIG. 6, an obtained result may be the following matrix 1 after the n physical resource block groups are written into the interleaving matrix row by row in ascending order of the indexes of the physical resource block groups, namely, in an order of a physical resource block group 0→a physical resource block group 1→a physical resource block group 2→a physical resource block group 3→a physical resource block group 4; or if the interleaving matrix is in a form shown in FIG. 7, an obtained result may be the following matrix 2 after the n physical resource block groups are written into the interleaving matrix row by row in ascending order of the indexes of the physical resource block groups, namely, in an order of a physical resource block group 0→a physical resource block group 1→a physical resource block group 2→a physical resource block group 3→a physical resource block group 4.

$$\begin{bmatrix} 0 & 1 & * \\ 2 & 3 & 4 \end{bmatrix} \text{matrix 1; and}$$

$$\begin{bmatrix} 0 & 1 & 2 \\ * & 3 & 4 \end{bmatrix} \text{matrix 2}$$

It should be noted that the foregoing matrix 1 and matrix 2 are obtained by writing the n physical resource block groups into the interleaving matrix in ascending order of the indexes of the physical resource block groups, and the n physical resource block groups may alternatively be written into the interleaving matrix in another manner. This is not specifically limited in this embodiment of this application.

Alternatively, in this embodiment of this application, N/2 null values are inserted into intersections between the first row and the last N/2 columns of the interleaving matrix and N/2 null values are inserted into intersections between the last row and the first N/2 columns of the interleaving matrix, where N is 0 or N is a positive integer multiple of 2. Alternatively, in this embodiment of this application, a null values are inserted into intersections between the first row and the last a columns of the interleaving matrix, and b null values are inserted into intersections between the last row and the first b columns of the interleaving matrix, where a sum of a and b is equal to N, and N is a natural number.

Each physical resource block group may include at least one physical resource block. Physical resource blocks in the n physical resource block groups that are written into the interleaving matrix may be specifically physical resource blocks that are contiguous in terms of frequency, or may be physical resource blocks that are not contiguous in terms of frequency. This is not limited in this embodiment of this application.

102. The network device reads the n physical resource block groups from the interleaving matrix column by column, where the n read physical resource block groups are mapped to n virtual resource block groups.

Reading the n physical resource block groups from the interleaving matrix column by column means reading elements in each column of the interleaving matrix in the left-to-right order of the columns of the interleaving matrix. For each column of the interleaving matrix, the elements in the column are read in a top-to-bottom order, to read the n physical resource block groups written into the interleaving matrix. In a read process, when a null value in the interleaving matrix is encountered, a location of the null value is skipped, and an element at a next location continues to be read. For example, when the five physical resource block groups are read from the matrix 1, a result obtained through reading may be the physical resource block groups 0, 2, 1, 3, and 4. The indexes of the n physical resource block groups that are read by the network device from the interleaving matrix column by column are respectively indexes of physical resource block groups to which the n virtual resource block groups are mapped after interleaving. Each virtual resource block group includes at least one virtual resource block.

Specifically, the n virtual resource block groups are sorted in ascending order of indexes. A virtual resource block group i is mapped to a physical resource block group j. If the physical resource block group j is an $x^{th}$ physical resource block group that is read in the read process, the virtual resource block group i is a virtual resource block with an index x, where both i and j are integers greater than or equal to 0 and less than or equal to n−1, and x is an integer greater than or equal to 1 and less than or equal to n.

It should be noted that in this embodiment of this application, an $i^{th}$ (i is a positive integer) physical resource block group is a physical resource block group determined in ascending order of the indexes of the physical resource block groups, an $i^{th}$ (i is a positive integer) virtual resource block group is a virtual resource block group determined in ascending order of the indexes of the virtual resource block groups, an $i^{th}$ (i is a positive integer) physical resource block is a physical resource block determined in ascending order of indexes of physical resource blocks, and an $i^{th}$ (i is a positive integer) virtual resource block is a virtual resource block determined in ascending order of indexes of virtual resource blocks.

For example, referring to the following Table 1-1, in the scenario shown by the foregoing matrix 1, when the physical resource block groups 0, 2, 1, 3, and 4 are read from the interleaving matrix, the n read physical resource block groups are mapped to the n virtual resource block groups, that is, virtual resource block groups 0 to 4 are successively mapped to the physical resource block groups 0, 2, 1, 3, and 4.

TABLE 1-1

| Index of a VRB group | Index of a mapped PRB group after interleaving |
| --- | --- |
| 0 | 0 |
| 1 | 2 |
| 2 | 1 |
| 3 | 3 |
| 4 | 4 |

For example, referring to the following Table 1-2, in the scenario shown by the foregoing matrix 2, when the physical resource block groups 0, 1, 3, 2, and 4 are read from the interleaving matrix, the n read physical resource block groups are mapped to the n virtual resource block groups, that is, virtual resource block groups 0 to 4 are successively mapped to the physical resource block groups 0, 1, 3, 2, and 4.

TABLE 1-2

| Index of a VRB group | Index of a mapped PRB group after interleaving |
| --- | --- |
| 0 | 0 |
| 1 | 1 |
| 2 | 3 |
| 3 | 2 |
| 4 | 4 |

In another implementation, the network device may write and interleave indexes of virtual resource block groups column by column in step 101, and read the indexes of the virtual resource block groups from the interleaving matrix row by row in step 102, to obtain n physical resource block groups to which the n virtual resource block groups are mapped after interleaving.

Writing the virtual resource block groups column by column means writing the n virtual resource block groups into the rows of the interleaving matrix in the left-to-right order of the columns of the interleaving matrix and in a top-to-bottom order of rows in each column of the interleaving matrix. When the virtual resource block groups are written into the interleaving matrix and a null value in the interleaving matrix is encountered, a location of the null value is skipped, and no virtual resource block group is written into the location of the null value.

Specifically, the network device may write the n virtual resource block groups into the interleaving matrix column by column in ascending order of the indexes of the virtual resource block groups. To be specific, the network device may write the n virtual resource block groups into the columns of the interleaving matrix column by column in ascending order of the indexes of the virtual resource block groups, in the left-to-right order of the columns of the interleaving matrix, and in the top-to-bottom order of the rows in each column of the interleaving matrix.

Each virtual resource block group may include at least one virtual resource block. Virtual resource blocks in the n virtual resource block groups that are written into the interleaving matrix may be specifically virtual resource blocks with consecutive indexes, or may be virtual resource blocks with inconsecutive indexes. This is not limited in this embodiment of this application.

The network device reads the n virtual resource block groups from the interleaving matrix row by row, where the n read virtual resource block groups are mapped to the n physical resource block groups.

Reading the n virtual resource block groups from the interleaving matrix row by row means reading elements in each row of the interleaving matrix in the top-to-bottom order of the rows of the interleaving matrix. For each row of the interleaving matrix, the elements in the row are read in a left-to-right order, to read the n virtual resource block groups written into the interleaving matrix. In a read process, when a null value in the interleaving matrix is encountered, a location of the null value is skipped, and an element at a next location continues to be read.

Specifically, the n physical resource block groups are sorted in ascending order of indexes. A virtual resource block group i is mapped to a physical resource block group j. If the virtual resource block group j is an $x^{th}$ virtual resource block group that is read in the read process, the physical resource block group i is a physical resource block with an index x, where both i and j are integers greater than or equal to 0 and less than or equal to n−1, and x is an integer greater than or equal to 1 and less than or equal to n.

In this case, obtaining the n physical resource block groups to which the n virtual resource block groups are mapped after interleaving means determining the physical resource block group j corresponding to the virtual resource block group i. A method for determining the physical resource block group j is the same as that described above. Details are not described herein again.

It should be noted that, based on the interleaving matrix provided in this embodiment of this application, a physical resource block group with a largest index in the n physical resource block groups written into the interleaving matrix may correspond to a virtual resource block group with a same index, or a virtual resource block group with a largest index in the n virtual resource block groups written into the interleaving matrix may correspond to a physical resource block group with a same index.

103. The network device determines, based on the n physical resource block groups mapped to the n virtual resource block groups, physical resource blocks mapped to virtual resource blocks in the n virtual resource block groups.

The network device may determine, based on the n physical resource block groups mapped to the n virtual resource block groups, the physical resource blocks mapped to the virtual resource blocks in the n virtual resource block groups, to transmit complex-valued symbols based on the determined physical resource blocks.

For a virtual resource block group and a physical resource block group that correspond to each other, a virtual resource block in the virtual resource block group corresponds to a physical resource block in the physical resource block group. Optionally, virtual resource blocks in the virtual resource block group are in a one-to-one correspondence with physical resource blocks in the physical resource block group, and an $x^{th}$ virtual resource block in the virtual resource block group corresponds to an $x^{th}$ physical resource block in the physical resource block group, where x is an integer greater than or equal to 1 and less than or equal to L, and L is a quantity of virtual resource blocks in the virtual resource block group, and is also a quantity of physical resource blocks in the physical resource block group. Optionally, virtual resource blocks in the virtual resource block group are in a one-to-one correspondence with physical resource blocks in the physical resource block group, and an $x^{th}$ virtual resource block in the virtual resource block group corresponds to an $(L-x+1)^{th}$ physical resource block in the physical resource block group, where x is an integer greater than 1 and less than or equal to L, and L is a quantity of virtual resource blocks in the virtual resource block group, and is also a quantity of physical resource blocks in the physical resource block group. For example, in the scenario shown by the matrix 1, for a correspondence among a virtual resource block group, a virtual resource block, a physical resource block group, and a physical resource block, refer to the following Table 2 or Table 3. In Table 2, the $x^{th}$ virtual resource block in the virtual resource block group corresponds to the $x^{th}$ physical resource block in the physical resource block group. In Table 3, the $x^{th}$ virtual resource block in the virtual resource block group corresponds to the $(L-x+1)^{th}$ physical resource block in the physical resource block group.

TABLE 2

| Index of a VRB group | Index of a VRB | Index of a mapped PRB group after interleaving | Index of a PRB |
| --- | --- | --- | --- |
| 0 | 0, 1 | 0 | 0, 1 |
| 1 | 2, 3 | 2 | 4, 5 |
| 2 | 4, 5 | 1 | 2, 3 |
| 3 | 6, 7 | 3 | 6, 7 |
| 4 | 8 | 4 | 8 |

TABLE 3

| Index of a VRB group | Index of a VRB | Index of a mapped PRB group after interleaving | Index of a PRB |
| --- | --- | --- | --- |
| 0 | 0, 1 | 0 | 1, 0 |
| 1 | 2, 3 | 2 | 5, 4 |
| 2 | 4, 5 | 1 | 3, 2 |
| 3 | 6, 7 | 3 | 7, 6 |
| 4 | 8 | 4 | 8 |

Specifically, in this embodiment of this application, the network device may write an index of a physical resource block group into the interleaving matrix, and may also read an index of a physical resource block from the interleaving matrix; or the network device may write an index of a virtual resource block group into the interleaving matrix, and may also read the index of the virtual resource block group from the interleaving matrix. The index may be also referred to as a number, a sequence number, or the like.

Figure 10:
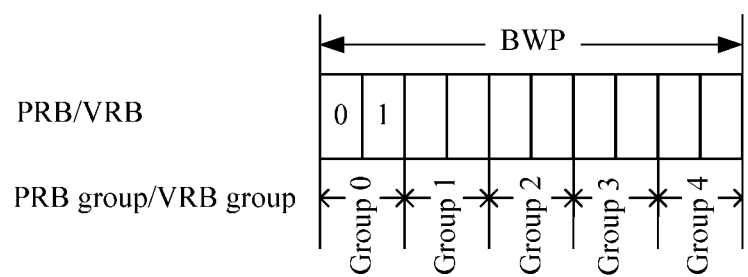
FIG. 10 is a schematic diagram of a grouping manner according to an embodiment of this application.

There are mainly the following two manners of determining the physical resource block group and the virtual resource block group:

In a first determining manner, referring to FIG. 10, a carrier bandwidth part includes $N_{BWP}^{size}$ physical resource blocks, and indexes of the physical resource blocks are determined in ascending order of frequencies. Physical resource block groups may be obtained through grouping and numbered based on the indexes of the physical resource blocks in the carrier bandwidth part. In this manner, in the carrier bandwidth part, the indexes of the physical resource blocks and indexes of the physical resource block groups are both numbered from 0. The physical resource blocks are grouped in ascending order of the indexes based on the reference value L, and the physical resource block groups obtained through grouping are also numbered in ascending order of the indexes. In this case, the carrier bandwidth part includes $\lceil N_{BWP}^{size}/L \rceil$ physical resource block groups, where $\lceil \ \rceil$ means rounding up. The reference value L may be related to channel quality. When the channel quality is relatively good, L may be relatively large, for example, may be 4; or when the channel quality is relatively poor, L may be relatively small, for example, may be 2.

In the first determining manner, in ascending order of the indexes of the physical resource block groups, the first $\lfloor N_{BWP}^{size}/L \rfloor$ physical resource block groups in the carrier bandwidth part, namely, the first to the penultimate physical resource block groups, each include L physical resource blocks, and the last physical resource block group may include L or less than L physical resource blocks. Specifically, a quantity of physical resource blocks in the last physical resource block group is $N_{BWP}^{size}-L \cdot \lfloor N_{BWP}^{size}/L \rfloor$, where $\lfloor \ \rfloor$ means rounding down.

In the first determining manner, the carrier bandwidth part corresponds to $N_{BWP}^{size}$ virtual resource blocks. Virtual resource block groups may be obtained through grouping and numbered based on indexes of the virtual resource blocks. In this manner, the indexes of the virtual resource blocks and indexes of the virtual resource block groups are both numbered from 0. The virtual resource blocks are grouped in ascending order of the indexes based on the reference value L, and the virtual resource block groups obtained through grouping are also numbered in ascending order of the indexes. In this case, the carrier bandwidth part corresponds to $\lceil N_{BWP}^{size}/L \rceil$ virtual resource block groups.

In the first determining manner, in ascending order of the indexes of the virtual resource block groups, the first $\lfloor N_{BWP}^{size}/L \rfloor$ virtual resource block groups corresponding to the carrier bandwidth part, namely, the first to the penultimate virtual resource block groups, each include L virtual resource blocks, and the last virtual resource block group may include L or less than L virtual resource blocks. Specifically, a quantity of virtual resource blocks in the last virtual resource block group is $N_{BWP}^{size}-L \cdot \lfloor N_{BWP}^{size}/L \rfloor$.

Figure 11:
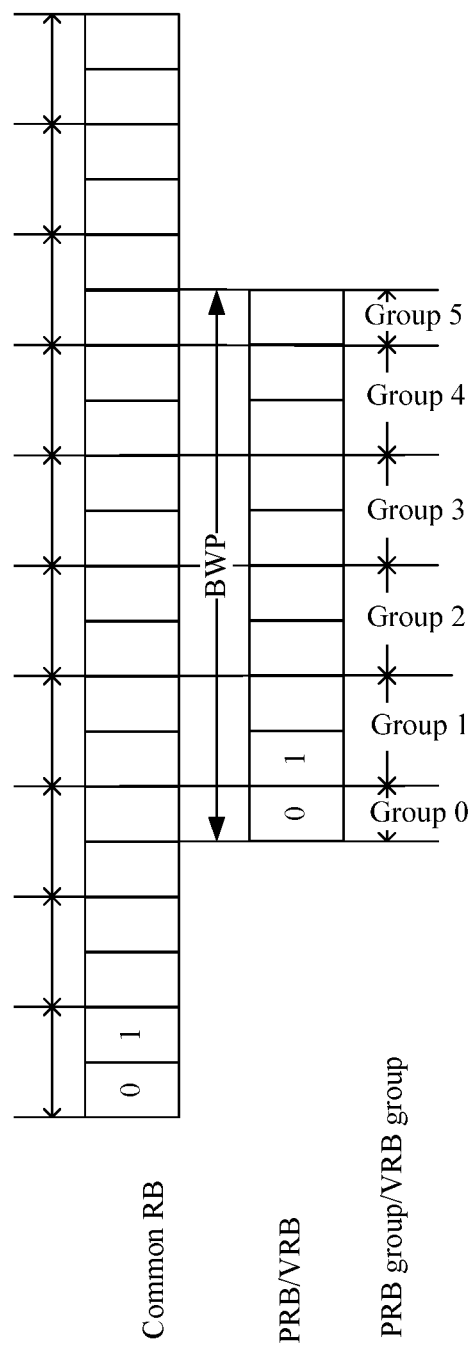
FIG. 11 is a schematic diagram of another grouping manner according to an embodiment of this application.

In a second determining manner, referring to FIG. 11, a carrier bandwidth part includes $N_{BWP}^{size}$ physical resource blocks, and indexes of the physical resource blocks are determined in ascending order of frequencies. Physical resource block groups may be obtained through grouping and numbered based on indexes of common resource blocks. In this manner, in the carrier bandwidth part, the indexes of the physical resource blocks and indexes of the physical resource block groups are both numbered from 0. The physical resource blocks are grouped in ascending order of the indexes based on the reference value L, and the physical resource block groups obtained through grouping are also numbered in ascending order of the indexes. In this case, the carrier bandwidth part includes $\lceil N_{BWP}^{size}/L \rceil$ or $\lceil N_{BWP}^{size}/L \rceil+1$ physical resource block groups. The first and the last physical resource block groups in the carrier bandwidth part each may include less than L physical resource blocks, and the second to the penultimate physical resource block groups each include L physical resource blocks. Specifically, a quantity of physical resource blocks included in the first physical resource block group is $L-N_{BWP}^{start}$ and a quantity of physical resource blocks included in the last physical resource block group is $(N_{BWP}^{start}+N_{BWP}^{size})$ mod L, where $N_{BWP}^{start}$ represents a location that is of a start physical resource block in the carrier bandwidth part and that is in the common resource blocks, and mod represents a modulo operation.

In the second determining manner, the start physical resource block in the carrier bandwidth part is configured based on the common resource blocks. Specifically, the common resource blocks are numbered from a common resource block 0 in ascending order of frequencies, and the start physical resource block in the carrier bandwidth part is a common resource block with an index N start $N_{BWP}^{start}$; or an offset of a frequency location of the start physical resource block in the carrier bandwidth part relative to a frequency location of the common resource block 0 is $N_{BWP}^{start}$ resource blocks. The common resource block 0 is determined by using a reference frequency location and an offset relative to the reference frequency location. Details are as follows:

(1) For a downlink carrier of a primary cell, the reference frequency location is determined based on a physical resource block with a lowest frequency in a synchronization signal block used for access by a terminal.

(2) For an uplink carrier of a primary cell in an unpaired spectrum, the reference frequency location is determined based on a physical resource block with a lowest frequency in a synchronization signal block used for access by a terminal.

(3) For an uplink carrier of a primary cell in a paired spectrum, the reference frequency location is determined based on a frequency location configured by a base station, and the frequency location may correspond to an absolute radio frequency channel number (absolute radio frequency channel number, ARFCN).

(4) For a secondary cell, the reference frequency location is determined based on a frequency location configured by a base station, and the frequency location may correspond to an absolute radio frequency channel number ARFCN.

(5) For a supplemental uplink carrier, the reference frequency location is determined based on a frequency location configured by a base station, and the frequency location may correspond to an absolute radio frequency channel number ARFCN.

In the second determining manner, the carrier bandwidth part corresponds to $N_{BWP}^{size}$ virtual resource blocks. Virtual resource block groups may be obtained through grouping and numbered based on the indexes of the common resource blocks. In this manner, in the carrier bandwidth part, indexes of the virtual resource blocks and indexes of the virtual resource block groups are both numbered from 0. The virtual resource blocks are grouped in ascending order of the indexes based on the reference value L, and the virtual resource block groups obtained through grouping are also numbered in ascending order of the indexes. In this case, the carrier bandwidth part includes $\lceil N_{BWP}^{size}/L \rceil$ or $\lceil N_{BWP}^{size}/L \rceil+1$ virtual resource block groups. The first and the last virtual resource block groups in the carrier bandwidth part each may include less than L virtual resource blocks, and the second to the penultimate virtual resource block groups each include L virtual resource blocks. Specifically, a quantity of virtual resource blocks included in the first virtual resource block group is $L-N_{BWP}^{start}$ mod L, and a quantity of virtual resource blocks included in the last virtual resource block group is $(N_{BWP}^{start}=N_{BWP}^{size})$ mod L.

Therefore, when the carrier bandwidth part includes a target physical resource block group including physical resource blocks whose quantity is less than the reference value L, the target physical resource block group may be a physical resource block group with a smallest index and/or a physical resource block group with a largest index in the carrier bandwidth part.

When the target physical resource block group is the physical resource block group with the smallest index in the carrier bandwidth part, a virtual resource block group with a smallest index also includes virtual resource blocks whose quantity is less than L. Specifically, when the PRBs are written row by row, if the n physical resource block groups include the physical resource block group with the smallest index, the physical resource block group with the smallest index is written into a location corresponding to an intersection (namely, an upper left corner of the interleaving matrix) between the first row and the first column of the interleaving matrix, and the physical resource block group with the smallest index is first read. In this way, the obtained virtual resource block group with the smallest index corresponds to the physical resource block group with the smallest index in the carrier bandwidth part. Alternatively, when the VRBs are written column by column, if the n virtual resource block groups include the virtual resource block group with the smallest index, the virtual resource block group with the smallest index is written into a location corresponding to an intersection (namely, an upper left corner of the interleaving matrix) between the first row and the first column of the interleaving matrix, and the virtual resource block group with the smallest index is first read. In this way, the obtained virtual resource block group with the smallest index also corresponds to the physical resource block group with the smallest index in the carrier bandwidth part. If the n physical resource block groups do not include the physical resource block group with the smallest index or the n virtual resource block groups do not include the virtual resource block group with the smallest index, the virtual resource block group with the smallest index directly (without interleaving) corresponds to the physical resource block group with the smallest index in the carrier bandwidth part.

When the target physical resource block group is the physical resource block group with the largest index in the carrier bandwidth part, a virtual resource block group with a largest index also includes virtual resource blocks whose quantity is less than L. Specifically, when the PRBs are written row by row, if the n physical resource block groups include the physical resource block group with the largest index, the physical resource block group with the largest index is written into a location corresponding to an intersection (namely, a lower right corner of the interleaving matrix) between the last row the last column of the interleaving matrix, and the physical resource block group with the largest index is last read. In this way, the obtained virtual resource block group with the largest index corresponds to the physical resource block group with the largest index in the carrier bandwidth part. Alternatively, when the VRBs are written column by column, if the n virtual resource block groups include the virtual resource block group with the largest index, the virtual resource block group with the largest index is written into a location corresponding to an intersection (namely, a lower right corner of the interleaving matrix) between the last row and the last column of the interleaving matrix, and the virtual resource block group with the largest index is last read. In this way, the obtained virtual resource block group with the largest index also corresponds to the physical resource block group with the largest index in the carrier bandwidth part. If the n physical resource block groups do not include the physical resource block group with the largest index or the n virtual resource block groups do not include the virtual resource block group with the largest index, the virtual resource block group with the largest index directly (without interleaving) corresponds to the physical resource block group with the largest index in the carrier bandwidth part.

In this way, regardless of whether the target physical resource block group is the physical resource block group with the smallest index or the physical resource block group with the largest index in the carrier bandwidth part, the network device can determine a virtual resource block group corresponding to the target physical resource block group, so that the network device can map complex-valued symbols to virtual resource blocks that are in the virtual resource block group and whose quantity is the same as that of physical resource blocks in the target physical resource block group, to ensure that the quantity of resource blocks included in the virtual resource block group matches the quantity of resource blocks included in the physical resource block group, thereby ensuring that data mapped to a VRB can be correctly transmitted on a PRB.

It should be noted that in this embodiment of this application, a $k^{th}$ physical resource block group is a physical resource block group determined in ascending order of the indexes, the last physical resource block group is the physical resource block group with the largest index, and the first physical resource block group is the physical resource block group with the smallest index.

Figure 12:
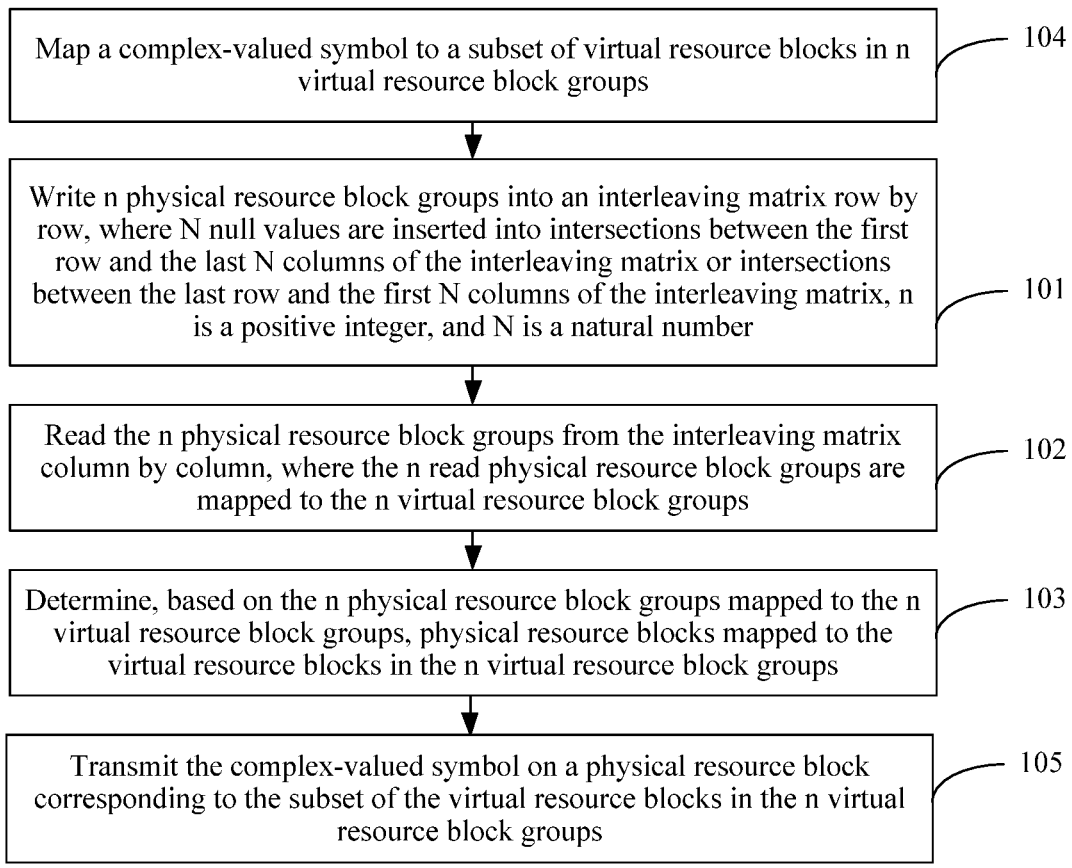
FIG. 12 is a flowchart of another resource mapping method according to an embodiment of this application.

Further, referring to FIG. 12, before step 101, the method may further include the following step:

104. The network device maps a complex-valued symbol to a subset of the virtual resource blocks in the n virtual resource block groups.

The subset may include a proper subset and a universal set. The subset of the virtual resource blocks in the n virtual resource block groups is some or all virtual resource blocks included in the n virtual resource block groups. In this embodiment of this application, the network device may first map the complex-valued symbol to the subset of the virtual resource blocks in the n virtual resource block groups, and then determine, through interleaving, the physical resource blocks mapped to the virtual resource blocks in the n virtual resource block groups, to determine a physical resource block mapped to a virtual resource block in the subset of the virtual resource blocks in the n virtual resource block groups.

Actually, the subset of the virtual resource blocks may be some of to-be-mapped virtual resource blocks. For example, when the network device is a terminal or a base station, the to-be-mapped virtual resource blocks may be virtual resource blocks allocated by the base station to the terminal from the carrier bandwidth part. The to-be-mapped virtual resource blocks may be virtual resource blocks that are contiguous in terms of frequency, or may be virtual resource blocks that are not contiguous in terms of frequency. The network device may first map complex-valued symbols to the to-be-mapped virtual resource blocks, and then determine, through interleaving, the physical resource blocks mapped to the virtual resource blocks in the n virtual resource block groups.

The allocated virtual resource blocks may be virtual resource blocks that are contiguous in frequency domain, or may be virtual resource blocks that are not contiguous in frequency domain. When the allocated virtual resource blocks are virtual resource blocks that are contiguous in frequency domain, the virtual resource blocks that are contiguous in frequency domain may be mapped, through interleaving, to physical resource blocks that are not contiguous in frequency domain, so that burst errors generated together in a channel transmission process can be dispersed, thereby reducing impact of a channel.

After step 103, the method may further include the following step:

105. The network device transmits the complex-valued symbol on a physical resource block corresponding to the subset of the virtual resource blocks in the n virtual resource block groups.

After determining the physical resource blocks mapped to the virtual resource blocks in the n virtual resource block groups, the network device may determine the physical resource block corresponding to the subset of the virtual resource blocks, to transmit, on the physical resource block corresponding to the subset of the virtual resource blocks, the complex-valued symbol mapped to the subset of the virtual resource blocks. Actually, the network device may transmit the complex-valued symbols on physical resource blocks corresponding to the to-be-mapped virtual resource blocks. A virtual resource block that is in the to-be-mapped resource blocks and for which a corresponding physical resource block is not determined based on the interleaving matrix directly corresponds to a physical resource block in a physical resource block group having a same index as a virtual resource block group including the virtual resource block.

In this way, the network device can determine, without calculating interleaving in advance, the virtual resource block group corresponding to the target physical resource block group, so that the network device can map the complex-valued symbols to the virtual resource blocks that are in the virtual resource block group and whose quantity is the same as that of physical resource blocks in the target physical resource block group, thereby ensuring that the complex-valued symbols mapped to these virtual resource blocks in the virtual resource block group can be correctly transmitted on corresponding physical resource blocks in the target physical resource block group. Specifically, when the target physical resource block group includes s physical resource blocks, the network device may map the complex-valued symbols to s corresponding virtual resource block groups in the corresponding virtual resource block group, where s is a positive integer less than L.

In some embodiments, the n physical resource block groups form the carrier bandwidth part. In step 101, the network device may write, into the interleaving matrix, all physical resource block groups included in the carrier bandwidth part, or write, into the interleaving matrix, all virtual resource block groups corresponding to the carrier bandwidth part, to obtain the n physical resource block groups to which the n virtual resource block groups corresponding to the carrier bandwidth part are mapped after interleaving, and the physical resource blocks mapped to the virtual resource blocks corresponding to the carrier bandwidth part. The n physical resource block groups form the carrier bandwidth part, and the indexes of the physical resource blocks and the indexes of the n physical resource block groups are sorted in ascending order of frequencies in the carrier bandwidth part.

For example, if the reference value L is 2, and the row quantity of the interleaving matrix is 2, the carrier bandwidth part includes physical resource blocks 0 to 8 that are a total of nine physical resource blocks, and the carrier bandwidth part corresponds to virtual resource blocks 0 to 8 that are a total of nine virtual resource blocks. In the first determining manner, five physical resource block groups included in the carrier bandwidth part are the physical resource block groups 0 to 4. For a correspondence between a physical resource block group and a physical resource block, refer to the third column and the fourth column in Table 2. Five virtual resource block groups corresponding to the carrier bandwidth part are the virtual resource block groups 0 to 4. For a correspondence between a virtual resource block group and a virtual resource block, refer to the first column and the second column in Table 2.

It can be learned from the first column and the second column in Table 2 that a quantity of virtual resource blocks corresponding to the carrier bandwidth part is 9 and is a non-integer multiple of the reference value 2, and a quantity of virtual resource blocks included in the last virtual resource block group, namely, the virtual resource block group 4, in the carrier bandwidth part is less than the reference value 2, where the virtual resource block group 4 includes one virtual resource block. It can be learned from the third column and the fourth column in Table 2 that a quantity of physical resource blocks included in the carrier bandwidth part is 9 and is a non-integer multiple of the reference value 2, and a quantity of physical resource blocks included in the last physical resource block group, namely, the physical resource block group 4, in the carrier bandwidth part is less than the reference value 2, where the physical resource block group 4 includes one physical resource block.

The column quantity of the interleaving matrix $C=\lceil N_{BWP}^{size}/(LR)\rceil=\lceil 9/(2\times 2)\rceil=3$, where $N_{BWP}^{size}$ represents the quantity 9 of physical resource blocks included in the carrier bandwidth part, L represents the reference value 2, R represents the row quantity 2 of the interleaving matrix, and $\lceil\ \rceil$ means rounding up. The physical resource block groups are written, row by row, into the interleaving matrix provided in this embodiment of this application and then read column by column, to obtain the correspondence shown in Table 2.

It can be learned from Table 2 that the virtual resource block group 4 corresponds to the physical resource block group 4, and the virtual resource block group 4 and the physical resource block group 4 each include one (less than the reference value 2) resource block; and the virtual resource block groups 0, 1, 2, and 3 respectively correspond to the physical resource block groups 0, 2, 1, and 3, and the virtual resource block groups 0, 1, 2, and 3 and the physical resource block groups 0, 2, 1, and 3 each include two (equal to the reference value 2) resource blocks. A quantity of resource blocks in a virtual resource block group in the carrier bandwidth part is equal to a quantity of resource blocks included in a physical resource block group to which the virtual resource block group is mapped after interleaving.

When complex-valued symbols are mapped to the virtual resource block groups in the carrier bandwidth part, complex-valued symbols corresponding to two resource blocks may be mapped to each of the virtual resource block groups 0, 1, 2, and 3, and a complex-valued symbol corresponding to one resource block may be mapped to the virtual resource block group 4, so that the complex-valued symbols mapped to the virtual resource block groups can be correctly transmitted on the physical resource blocks in the physical resource block groups.

When the quantity of physical resource blocks included in the carrier bandwidth part is an integer multiple of the reference value, the quantity of physical resource blocks included in the last physical resource block group in the carrier bandwidth part and the quantity of virtual resource blocks included in the last virtual resource block group corresponding to the carrier bandwidth part are both equal to the reference value, and the quantity of resource blocks included in the virtual resource block group is equal to the quantity of resource blocks included in the physical resource block group to which the virtual resource block group is mapped after interleaving, so that the complex-valued symbols mapped to the virtual resource blocks can be correctly transmitted on the physical resource blocks.

In some other embodiments, the n physical resource block groups are a proper subset of m physical resource block groups included in the carrier bandwidth part, and the n physical resource block groups include the last physical resource block group in the m physical resource block groups.

That the n physical resource block groups are a proper subset of m physical resource block groups included in the carrier bandwidth part means that the n physical resource block groups are some of the m physical resource block groups.

The last physical resource block group in the m physical resource block groups is a physical resource block group with a largest index in the m physical resource block groups. Based on the interleaving matrix provided in this embodiment of this application, the n physical resource blocks group are written into the interleaving matrix row by row in ascending order of the indexes, and are read column by column, so that the physical resource block group with the largest index in the n physical resource block groups written into the interleaving matrix can correspond to the virtual resource block group with the same index. When the n physical resource block groups are the proper subset of the m physical resource block groups included in the carrier bandwidth part, and the n physical resource block groups include the last physical resource block group in the m physical resource block groups, the last physical resource block group that is in the carrier bandwidth part and that is written into the interleaving matrix corresponds to the last virtual resource block group in the carrier bandwidth part.

In a specific scenario, the foregoing second determining manner is used for the physical resource blocks included in the carrier bandwidth part and the corresponding virtual resource blocks, and a quantity of virtual resource blocks included in the first virtual resource block group in the carrier bandwidth part and a quantity of virtual resource blocks included in the last virtual resource block group in the carrier bandwidth part are less than L. In the scenario, the n physical resource block groups are the proper subset of the m physical resource block groups corresponding to the carrier bandwidth part, and the n physical resource block groups are defined in the carrier bandwidth part, and may include the last physical resource block group in the carrier bandwidth part, where m is a positive integer greater than n. The n virtual resource block groups corresponding to the n physical resource block groups are a proper subset of m virtual resource block groups corresponding to the carrier bandwidth part. For example, the n physical resource block groups may be the second physical resource block group to the last physical resource block group in the m physical resource block groups. Physical resource blocks corresponding to virtual resource blocks in the second virtual resource block group to the last virtual resource block group in the m virtual resource block groups may be determined based on the interleaving matrix provided in this embodiment of this application, and the last virtual resource block group including less than L virtual resource blocks in the carrier bandwidth part corresponds to the last physical resource block group in the carrier bandwidth part. Because the first virtual resource block group including less than L virtual resource blocks in the carrier bandwidth part is written into the interleaving matrix, the first virtual resource block group may directly correspond to the first physical resource block group in the carrier bandwidth part. Therefore, the network device may determine a virtual resource block group including virtual resource blocks whose quantity is less than L and a physical resource block group, thereby ensuring that complex-valued symbols mapped to virtual resource blocks can be correctly transmitted on physical resource blocks.

For example, the row quantity of the interleaving matrix is R=2, the carrier bandwidth part includes eight VRBs with indexes 0 to 7, the reference value L=2, indexes of VRB groups are 0 to 4, the carrier bandwidth part includes eight PRBs with indexes 0 to 7, indexes of PRB groups are 0 to 4, a correspondence between a physical resource block group and a physical resource block is shown in the third column and the fourth column in Table 4, and a correspondence between a virtual resource block group and a virtual resource block is shown in the first column and the second column in Table 4. In this case, the column quantity of the interleaving matrix is C=2. After the PRB group 1 to the PRB group 4 (the second to the penultimate PRB groups) are written into the interleaving matrix, a correspondence between a PRB group and a VRB group and a correspondence between a PRB and a VRB are obtained, and reference may be made to the following Table 4.

TABLE 4

| Index of a VRB group | Index of a VRB | Index of a mapped PRB group after interleaving | Index of a PRB |
|---|---|---|---|
| 0 | 0 | 0 | 0 |
| 1 | 1, 2 | 1 | 1, 2 |
| 2 | 3, 4 | 3 | 5, 6 |
| 3 | 5, 6 | 2 | 3, 4 |
| 4 | 7 | 4 | 7 |

It can be learned from Table 4 that only the VRB group 0 (the first VRB group) and the VRB group 4 (the last VRB group) each include one (less than L) VRB, only the PRB group 0 (the first PRB group) and the PRB group 4 (the last PRB group) each include one (less than L) PRB, the VRB group 0 corresponds to the PRB group 0, and the VRB group 4 corresponds to the PRB group 4.

In some other embodiments, for example, in the solution in which the VRBs are written column by column, the n virtual resource block groups are a proper subset of m virtual resource block groups corresponding to the carrier bandwidth part, and the n virtual resource block groups include the last virtual resource block group in the m virtual resource block groups.

That the n virtual resource block groups are a proper subset of m virtual resource block groups corresponding to the carrier bandwidth part means that the n virtual resource block groups are some of the m virtual resource block groups.

The last virtual resource block group in the m virtual resource block groups is a virtual resource block group with a largest index in the m virtual resource block groups. Based on the interleaving matrix provided in this embodiment of this application, the n virtual resource blocks group are written into the interleaving matrix column by column in ascending order of the indexes, and are read row by row, so that the virtual resource block group with the largest index in the n virtual resource block groups written into the interleaving matrix can correspond to the physical resource block group with the same index. When the n virtual resource block groups are the proper subset of the m virtual resource block groups included in the carrier bandwidth part, and the n virtual resource block groups include the last virtual resource block group in the m virtual resource block groups, the last virtual resource block group that is in the carrier bandwidth part and that is written into the interleaving matrix corresponds to the last physical resource block group in the carrier bandwidth part.

In this embodiment of this application, the row quantity of the interleaving matrix may be 2, the quantity N of null values may be 0 or 1, the n physical resource block groups form the carrier bandwidth part, and the physical resource block groups and the virtual resource block groups are obtained through grouping in the first determining manner or the second determining manner. On a basis of this, step 101 and step 102 are described in another manner below. The virtual resource block group i is mapped to the physical resource block group j, and the following is met:

$$j = \begin{cases} cR+r, & i = \lceil N_{BWP}^{size}/L \rceil - 1 \text{ and } N > 0 \\ r(C+(-1)^N)+c, & \text{other values} \end{cases}$$

$i = cR+r$ $r = 0, 1, \ldots, R-1$; or $c = 0, 1, \ldots, C-1$ $R = 2$ $$j = \begin{cases} r(R-C)+c+(C-1), & i \neq 0 \text{ and } N > 0 \\ rC+c, & \text{other values} \end{cases}$$

$i = cR+r$ $r = 0, 1, \ldots, R-1$, where $c = 0, 1, \ldots, C-1$ $R = 2$

R represents the row quantity of the interleaving matrix; C represents the column quantity of the interleaving matrix; N represents the quantity of null values; $C = \lceil N_{BWP}^{size}/(LR) \rceil$ and $N = RC - \lceil N_{BWP}^{size}/L \rceil$, or $C = \lceil N_{BWP}^{bundle}/R \rceil$ and $N = RC - N_{BWP}^{bundle}$; $N_{BWP}^{size}$ represents the quantity of physical resource blocks included in the carrier bandwidth part; $N_{BWP}^{bundle}$ represents the quantity of virtual resource block groups and/or physical resource block groups in the carrier bandwidth part; and L represents the reference value.

In this embodiment of this application, the row quantity of the interleaving matrix may be 2, the quantity N of null values may be 0 or 1, the n physical resource block groups form the carrier bandwidth part, and the physical resource block groups and the virtual resource block groups are obtained through grouping in the first determining manner or the second determining manner. On a basis of this, step 101 and step 102 are described in another manner below. The virtual resource block group i is mapped to the physical resource block group j, and the following is met:

$j = rC+c-\Delta$ $i = cR+r$ $r = 0, 1, \ldots, R-1$ $c = 0, 1, \ldots, C-1$ $R = 2$, where $\Delta = (r - \max\{c-1, 0\} \cdot (C-1)) \cdot N$ or $\Delta = (r - \max\{c-1, 0\} \cdot c) \cdot N$; R represents the row quantity of the interleaving matrix; C represents the column quantity of the interleaving matrix; N represents the quantity of null values; $C = \lceil N_{BWP}^{size}/(LR) \rceil$ and $N = RC - \lceil N_{BWP}^{size}/L \rceil$, or $C = \lceil N_{BWP}^{bundle}/R \rceil$ and $N = RC - N_{BWP}^{bundle}$; $N_{BWP}^{size}$ represents the quantity of physical resource blocks included in the carrier bandwidth part; $N_{BWP}^{bundle}$ represents the quantity of virtual resource block groups and/or physical resource block groups in the carrier bandwidth part; L represents the reference value; and max means obtaining a maximum value.

Alternatively, the following is met:

$j = rC+c-\Delta$ $i = cR+r$ $r = 0, 1, \ldots, R-1$ $c = 0, 1, \ldots, C-1$ $R = 2$, where $\Delta = (r-1) \cdot C \cdot N \cdot \lceil i/(RC) \rceil$, or $\Delta = (r-1) \cdot C \cdot N \cdot \lceil (r+c)/(RC) \rceil$; or $\Delta = (r-1) \cdot C \cdot N \cdot \lceil \max\{r,c\}/(RC) \rceil$, where R represents the row quantity of the interleaving matrix; C represents the column quantity of the interleaving matrix; N represents the quantity of null values; $C = \lceil N_{BWP}^{size}/(LR) \rceil$ and $N = RC - \lceil N_{BWP}^{size}/L \rceil$, or $C = \lceil N_{BWP}^{bundle}/R \rceil$ and $N = RC - N_{BWP}^{bundle}$; $N_{BWP}^{size}$ represents the quantity of physical resource blocks included in the carrier bandwidth part; $N_{BWP}^{bundle}$ represents the quantity of virtual resource block groups and/or physical resource block groups in the carrier bandwidth part; and L represents the reference value.

Further, before step 104, the method may further include the following step:

106. The network device receives the carrier bandwidth part and the allocated virtual resource blocks in the carrier bandwidth part, where the carrier bandwidth part and the allocated virtual resource blocks in the carrier bandwidth part are sent by another network device.

When the network device is a terminal, the another network device may be a base station. Before mapping the complex-valued symbols to the virtual resource blocks, the terminal may further receive configuration information sent by the base station. The configuration information is information about related resources allocated to the terminal, may include the carrier bandwidth part and the allocated virtual resource blocks in the carrier bandwidth part, and may further include the reference value L and the like.

It should be noted that the carrier bandwidth part, the allocated virtual resource blocks in the carrier bandwidth part, the reference value L, and the like in the configuration information may be transmitted in a same message, or may be transmitted in different messages. This is not specifically limited in this embodiment of this application.

In addition, when the network device is a base station, the base station may alternatively determine the configuration information, and does not need to receive the configuration information from another network device.

Another embodiment of this application provides a resource mapping method. The method may include steps 101 to 106 in the foregoing embodiment. For details, refer to the foregoing related descriptions of steps 101 to 106. Only a difference is described herein.

In this embodiment of this application, when a carrier bandwidth part includes n physical resource block groups, n resource block groups written into an interleaving matrix are the n physical resource block groups forming the carrier bandwidth part.

Different from the interleaving matrix provided in step 101, the interleaving matrix in this embodiment of this application may be in a form shown by the following matrix 3:

$$\begin{bmatrix} 0 & 1 & \ldots & C-2 & 2C-2 \\ C & C+1 & \ldots & C-1 & * \end{bmatrix} \text{matrix 3}$$

An element in the matrix 3 represents an index of a physical resource block group written into the interleaving matrix; C represents a column quantity of the interleaving matrix; $n = \lceil N_{BWP}^{size}/L \rceil$ and $C = \lceil N_{BWP}^{size}/(LR) \rceil$, or $n = N_{BWP}^{bundle}$ and $C = \lceil N_{BWP}^{bundle}/R \rceil$; * represents a null value; the null value is located in the last N columns in the last row of the interleaving matrix; and N is 0 or 1, that is, the null value is located at the end of the last row of the interleaving matrix.

Different from writing the physical resource block groups into the interleaving matrix row by row in ascending order of the physical resource block groups in the foregoing embodiment, in this embodiment of this application, a network device writes the n physical resource block groups into the interleaving matrix based on an index corresponding to each element in the matrix 3. If the interleaving matrix is not filled, a null value is inserted into the end of the last row of the interleaving matrix, to fill the interleaving matrix.

Specifically, the network device may write the n physical resource block groups into the interleaving matrix in a top-to-bottom order of rows of the interleaving matrix and in a left-to-right order of columns in each row of the interleaving matrix based on the index corresponding to each element in the matrix 3.

For example, a row quantity of the interleaving matrix is R=2, the carrier bandwidth part includes nine VRBs with indexes 0 to 8, a reference value L=2, indexes of VRB groups are 0 to 4, there are a total of $n=_5$ VRB groups, the carrier bandwidth part includes nine PRBs with indexes 0 to 8, indexes of PRB groups are 0 to 4, and there are a total of n=5 PRB groups. In this case, the column quantity of the interleaving matrix is C=3, and $\lceil N_{BWP}^{size}/L \rceil = \lceil 9/2 \rceil = 5$. It can be learned that $n = \lceil N_{BWP}^{size}/L \rceil = \lceil 9/2 \rceil = 5$.

After the n physical resource block groups are written into the interleaving matrix row by row based on the index corresponding to each element in the matrix 3, an obtained result may be the following matrix 4:

$$\begin{bmatrix} 0 & 1 & 2C-2=4 \\ 3 & C-1=2 & * \end{bmatrix} \text{matrix 4}$$

Alternatively, in this embodiment of this application, a manner in which the physical resource block groups are written into the interleaving matrix may be understood as follows: The n physical resource block groups are written into the interleaving matrix in ascending order of index numbers of the physical resource block groups, in a top-to-bottom order of rows of the interleaving matrix, and in a left-to-right order of columns in each row of the interleaving matrix. If the interleaving matrix is not filled, a null value is inserted into the end of the last row of the interleaving matrix, to fill the interleaving matrix. Then, a physical resource block group in the last column in the first row is interchanged with a physical resource block group in the penultimate column in the last row.

For example, after the physical resource block groups 0 to 4 included in the carrier bandwidth part are written into the interleaving matrix row by row in ascending order of the indexes, an obtained result may be the following matrix 5:

$$\begin{bmatrix} 0 & 1 & 2 \\ 3 & 4 & * \end{bmatrix} \text{matrix 5}$$

The following matrix 6 may be obtained after the last column in the first row is interchanged with the penultimate column in the last row:

$$\begin{bmatrix} 0 & 1 & 4 \\ 3 & 2 & * \end{bmatrix} \text{matrix 6}$$

In addition, in this embodiment of this application, the physical resource block groups and the virtual resource block groups in the carrier bandwidth part are obtained through grouping in the first determining manner.

In this way, regardless of whether a target physical resource block group is a physical resource block group with a smallest index or a physical resource block group with a largest index in the carrier bandwidth part, the network device can determine, without calculating interleaving in advance, a virtual resource block group corresponding to the target physical resource block group, so that the network device can map complex-valued symbols to virtual resource blocks that are in the virtual resource block group and whose quantity is the same as that of physical resource blocks in the target physical resource block group, thereby ensuring that the complex-valued symbols mapped to these virtual resource blocks in the virtual resource block group can be correctly transmitted on corresponding physical resource blocks in the target physical resource block group.

In this embodiment of this application, a virtual resource block group i is mapped to a physical resource block group j, and the following is met:

$j=rC+C$ $i=cR+r$ $r=\{0,1,\ldots,R-1\}\backslash\{r',r''\}$ $c=\{0,1,\ldots,C-1\}\backslash\{c',c''\}$ $\lceil N_{BWP}^{size}/L \rceil = c'R+r' = r''C+c''$ $f(c'R+r')=r''C+c''$ $f(c''R+r'')=r'C+c'$ $R=2$ $C=\lceil N_{BWP}^{size}/(LR)\rceil$, where R represents the row quantity of the interleaving matrix; C represents the column quantity of the interleaving matrix; N represents a quantity of null values; $N_{BWP}^{size}$ represents a quantity of physical resource blocks included in the carrier bandwidth part; L represents the reference value; $\lceil\ \rceil$ means rounding up; mod represents a modulo operation; $\{0, 1, \ldots, R-1\}\setminus\{r',r''\}$ represents a set formed by elements remaining after a set $\{r',r''\}$ is removed from a set $\{0, 1, \ldots, R-1\}$; and $\{0, 1, \ldots, C-1\}\setminus\{c',c''\}$ represents a set formed by elements remaining after a set $\{c',c''\}$ is removed from a set $\{0, 1, \ldots, C-1\}$.

The foregoing formula may alternatively be applicable only to a case in which $N_{BWP}^{size}$ mod L>0. In this case, for $N_{BWP}^{size}$ mod L=0, the following is met:

$j=rC+C$ $i=cR+r$ $r=0,1,\ldots,R-1$ $c=0,1,\ldots,C-1$ $R=2$ $C=\lceil N_{BWP}^{size}/(LR)\rceil$, where R represents the row quantity of the interleaving matrix; C represents the column quantity of the interleaving matrix; N represents a quantity of null values; $N_{BWP}^{size}$ represents a quantity of physical resource blocks included in the carrier bandwidth part; L represents the reference value; and $\lceil\ \rceil$ means rounding up.

Another embodiment of this application provides a resource mapping method.

When physical resource block groups are obtained through grouping in the foregoing first determining manner, that is, $N_{BWP}^{size}$ physical resource blocks forming a carrier bandwidth part are grouped into a total of $\lceil N_{BWP}^{size}/L\rceil$ physical resource block groups. The first by $\lfloor N_{BWP}^{size}/L\rfloor$ physical resource block groups each include L physical resource blocks, and the last physical resource block group includes $N_{BWP}^{size}-L\cdot\lfloor N_{BWP}^{size}/L\rfloor$ physical resource blocks.

$N_{BWP}^{size}$ virtual resource blocks corresponding to the carrier bandwidth part are grouped into $\lceil N_{BWP}^{size}/L\rceil$ virtual resource block groups. The $\lfloor N_{BWP}^{size}/L\rfloor$ virtual resource block groups each include L virtual resource blocks, and one virtual resource block group includes $N_{BWP}^{size}-L\cdot\lfloor N_{BWP}^{size}/L\rfloor$ virtual resource blocks.

n physical resource block groups are sorted in ascending order of indexes, and the n physical resource block groups are a subset of the $\lceil N_{BWP}^{size}/L\rceil$ physical resource block groups.

In a possible case, if the n physical resource block groups include the last physical resource block group in the carrier bandwidth part, when n=RC, the last virtual resource block group in n virtual resource block groups includes $N_{BWP}^{size}-L\cdot\lfloor N_{BWP}^{size}/L\rfloor$ virtual resource blocks, and remaining virtual resource block groups each include L virtual resource blocks; or when n<RC, the penultimate virtual resource block group in n virtual resource block groups includes $N_{BWP}^{size}-L\cdot\lfloor N_{BWP}^{size}/L\rfloor$ virtual resource blocks, and remaining virtual resource block groups each include L virtual resource blocks.

The penultimate virtual resource block group is a virtual resource block group with a second largest (second largest) index in the n virtual resource block groups, and when indexes are sorted in ascending order of frequencies, may be specifically a virtual resource block group corresponding to a second highest (second highest) frequency.

In another possible case, if the n physical resource block groups do not include the last physical resource block group in the carrier bandwidth part, the last virtual resource block group in n virtual resource block groups includes $N_{BWP}^{size}-L\cdot\lfloor N_{BWP}^{size}/L\rfloor$ virtual resource blocks, and remaining virtual resource block groups each include L virtual resource blocks.

When physical resource block groups are obtained through grouping in the foregoing second determining manner, that is, $N_{BWP}^{size}$ physical resource blocks forming a carrier bandwidth part are grouped into a total of $\lceil N_{BWP}^{size}/L\rceil$ or $\lceil N_{BWP}^{size}/L\rceil+1$ physical resource block groups. The first physical resource block group includes $L-N_{BWP}^{start}$ mod L physical resource blocks, the last physical resource block group includes $(N_{BWP}^{start}+N_{BWP}^{size})$ mod L physical resource blocks, and remaining physical resource block groups each include L physical resource blocks.

$N_{BWP}^{size}$ virtual resource blocks corresponding to the carrier bandwidth part are grouped into $\lceil N_{BWP}^{size}/L\rceil$ or $\lceil N_{BWP}^{size}/L\rceil+1$ virtual resource block groups. The first virtual resource block group includes $L-N_{BWP}^{start}$ mod L virtual resource blocks, one virtual resource block group includes $(N_{BWP}^{start}+N_{BWP}^{size})$ mod L virtual resource blocks, and remaining virtual resource block groups each include L virtual resource blocks.

In a possible case, if n physical resource block groups include the last physical resource block group in the carrier bandwidth part, when n=RC, the last virtual resource block group in n virtual resource block groups includes $(N_{BWP}^{start}+N_{BWP}^{size})$ mod L virtual resource blocks, and remaining virtual resource block groups each include L virtual resource blocks; or when n<RC, the penultimate virtual resource block group in n virtual resource block groups includes $(N_{BWP}^{start}+N_{BWP}^{size})$ mod L virtual resource blocks, and remaining virtual resource block groups each include L virtual resource blocks.

In another possible case, if n physical resource block groups do not include the last physical resource block group in the carrier bandwidth part, the last virtual resource block group in n virtual resource block groups includes $(N_{BWP}^{start}+N_{BWP}^{size})$ mod L virtual resource blocks, and remaining virtual resource block groups each include L virtual resource blocks.

On a basis of this, the resource mapping method provided in this embodiment of this application may include steps 101 to 106 in the foregoing embodiment. For details, refer to the foregoing related descriptions of steps 101 to 106. Only a difference is described herein.

Figure 13:
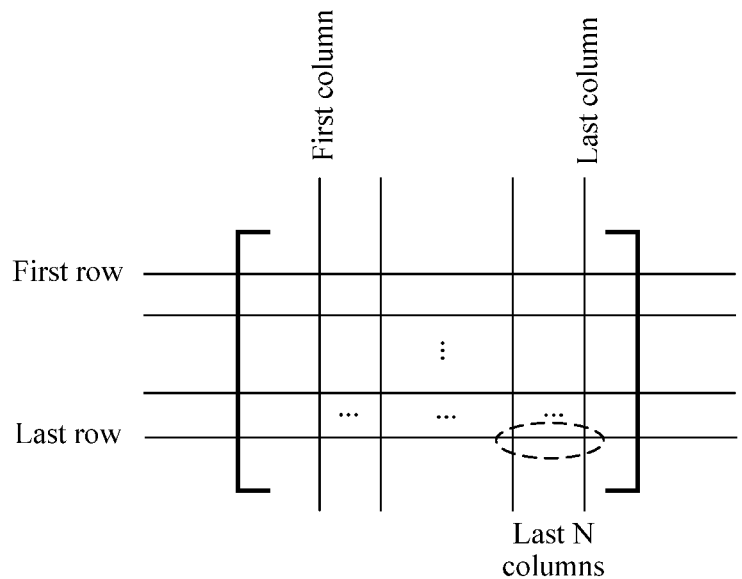
FIG. 13 is a schematic diagram of another interleaving matrix according to an embodiment of this application.

Different from the interleaving matrix provided in step 101, a row quantity of an interleaving matrix in this embodiment of this application may be 2, and a quantity N of null values may be 0 or 1. For example, an interleaving matrix in which N null values are inserted into the last N columns in the last row and that is shown in FIG. 13 may be used, where N is a natural number.

For example, a reference value L is 2, a physical resource block group 4 includes only one physical resource block 8, and a correspondence between a virtual resource block group and a virtual resource block is shown in the first column and the second column in Table 5. A virtual resource block group 3 includes only one virtual resource block. For a correspondence between an index of a virtual resource block and an index of a physical resource block, refer to the following Table 5.

TABLE 5

| Index of a VRB group | Index of a VRB | Index of a mapped PRB group after interleaving | Index of a PRB |
|---|---|---|---|
| 2 | 4, 5 | 1 | 2, 3 |
| 3 | 6 | 4 | 8 |
| 4 | 7, 8 | 2 | 4, 5 |

Another embodiment of this application provides a resource mapping method.

When virtual resource block groups are obtained through grouping in the foregoing first determining manner, that is, a carrier bandwidth part corresponds to $N_{BWP}^{size}$ virtual resource blocks that are grouped into a total of $\lceil N_{BWP}^{size}/L \rceil$ virtual resource block groups. The first $\lfloor N_{BWP}^{size}/L \rfloor$ virtual resource block groups each include L virtual resource blocks, and the last virtual resource block group includes $N_{BWP}^{size} - L \cdot \lfloor N_{BWP}^{size}/L \rfloor$ virtual resource blocks.

$N_{BWP}^{size}$ physical resource blocks forming the carrier bandwidth part are grouped into $\lceil N_{BWP}^{size}/L \rceil$ physical resource block groups. The $\lfloor N_{BWP}^{size}/L \rfloor$ physical resource block groups each include L physical resource blocks, and one physical resource block group includes $N_{BWP} - L \cdot \lfloor N_{BWP}^{size}/L \rfloor$ physical resource blocks.

n physical resource block groups are sorted in ascending order of indexes, and the n physical resource block groups are a subset of the $\lceil N_{BWP}^{size}/L \rceil$ physical resource block groups.

In a possible case, if the n physical resource block groups include the last physical resource block group in the carrier bandwidth part, when n=RC, the last physical resource block group in the n physical resource block groups includes $N_{BWP}^{size} - L \cdot \lfloor N_{BWP}^{size}/L \rfloor$ physical resource blocks, and remaining physical resource block groups each include L physical resource blocks; or when n<RC, a $C^{th}$ physical resource block group in the n physical resource block groups includes $N_{BWP}^{size} - L \cdot \lfloor N_{BWP}^{size}/L \rfloor$ physical resource blocks, and remaining physical resource block groups each include L physical resource blocks.

In another possible case, if the n physical resource block groups do not include the last physical resource block group in the carrier bandwidth part, the last physical resource block group in the n physical resource block groups includes $N_{BWP}^{size} - L \cdot \lfloor N_{BWP}^{size}/L \rfloor$ physical resource blocks, and remaining physical resource block groups each include L physical resource blocks.

When virtual resource block groups are obtained through grouping in the foregoing size second determining manner, that is, a carrier bandwidth part corresponds to $N_{BWP}^{size}$ virtual resource blocks that are grouped into a total of $\lceil N_{BWP}^{size}/L \rceil$ or $\lceil N_{BWP}^{size}/L \rceil+1$ virtual resource block groups. The first virtual resource block group includes $L - N_{BWP}^{start}$ mod L virtual resource blocks, the last virtual resource block group includes $(N_{BWP}^{start} + N_{BWP}^{size})$ mod L virtual resource blocks, and remaining virtual resource block groups each include L virtual resource blocks.

$N_{BWP}^{size}$ physical resource blocks forming the carrier bandwidth part are grouped into $\lceil N_{BWP}^{size}/L \rceil$ or $\lceil N_{BWP}^{size}/L \rceil+1$ physical resource block groups. The first physical resource block group includes $L - N_{BWP}^{start}$ mod L physical resource blocks, one physical resource block group includes $(N_{BWP}^{start} + N_{BWP}^{size})$ mod L physical resource blocks, and remaining physical resource block groups each include L physical resource blocks.

n physical resource block groups are sorted in ascending order of indexes, and the n physical resource block groups are a subset of the $\lceil N_{BWP}^{size}/L \rceil$ physical resource block groups.

In a possible case, if the n physical resource block groups include the last physical resource block group in the carrier bandwidth part, when n=RC, the last physical resource block group in the n physical resource block groups includes $(N_{BWP}^{start} + N_{BWP}^{size})$ mod L physical resource blocks, and remaining physical resource block groups each include L physical resource blocks; or when n<RC, a $C^{th}$ physical resource block group in the n physical resource block groups includes $(N_{BWP}^{start} + N_{BWP}^{size})$ mod L physical resource blocks, and remaining physical resource block groups each include L physical resource blocks.

In another possible case, if the n physical resource block groups do not include the last physical resource block group in the carrier bandwidth part, the last physical resource block group in the n physical resource block groups includes $(N_{BWP}^{start} + N_{BWP}^{size})$ mod L physical resource blocks, and remaining physical resource block groups each include L physical resource blocks.

In this embodiment, the resource mapping method may include steps 101 to 106 in the foregoing embodiment. For details, refer to the foregoing related descriptions of steps 101 to 106. Only a difference is described herein.

Different from the interleaving matrix provided in step 101, a row quantity of an interleaving matrix in this embodiment of this application may be 2, and a quantity N of null values may be 0 or 1. For example, an interleaving matrix in which N null values are inserted into the last N columns in the last row and that is shown in FIG. 13 may be used, where N is a natural number.

Another embodiment of this application provides a resource mapping method. The method may include steps 101 to 106 in the foregoing embodiment. For details, refer to the foregoing related descriptions of steps 101 to 106. Only a difference is described herein.

An interleaving matrix in this embodiment of this application may include but is not limited to the interleaving matrix provided in step 101 in this application and the interleaving matrix shown by the matrix 3, for example, an interleaving matrix in which N null values are inserted into the last N columns in the last row and that is shown in FIG. 13 may be used, where N is a natural number.

In addition, in this embodiment of this application, n physical resource block groups written into the interleaving matrix may correspond to different physical resource block groups in different cases, or n virtual resource block groups written into the interleaving matrix may correspond to different virtual resource block groups in different cases.

In a possible manner, in step 101, it is assumed that the first physical resource block group in a carrier bandwidth part includes physical resource blocks whose quantity is less than a reference value L, and the last physical resource group includes L physical resource blocks, and correspondingly, it is assumed that the first virtual resource block group includes virtual resource blocks whose quantity is less than the reference value L, and the last virtual resource group includes L virtual resource blocks. In this case, the n physical resource block groups do not include the first physical resource block group in the carrier bandwidth part, but include a physical resource block group other than the first physical resource block group in the carrier bandwidth part, and the n virtual resource block groups do not include the first virtual resource block group in the carrier bandwidth part, but include a virtual resource block group other than the first virtual resource block group in the carrier bandwidth part.

The manner may be applied to a scenario in which grouping is performed in the foregoing second determining manner. In this case, only one first-physical-resource-block-group includes physical resource blocks whose quantity is less than the reference value L, and only one first-virtual-resource-block-group includes virtual resource blocks whose quantity is less than the reference value L. When the first-physical-resource-block-group or the first-virtual-resource-block-group is not written into the interleaving matrix, the first-physical-resource-block-group directly corresponds to the first-virtual-resource-block-group, and a case in which a virtual resource block group including L virtual resource blocks is mapped to a resource block group including less than L physical resource blocks does not occur. Therefore, a case in which a virtual resource block is mapped to a resource block outside the carrier bandwidth part does not occur, so that a quantity of resource blocks included in the virtual resource block group matches a quantity of resource blocks included in the physical resource block group, and a complex-valued symbol can be correctly transmitted on the physical resource block.

Specifically, in a scenario in which grouping is performed in the first determining manner, a network device may determine, according to a calculation formula $N_{BWP} - L \cdot \lfloor N_{BWP}^{size}/L \rfloor$, whether a quantity of virtual resource blocks included in the last virtual resource block group is less than L.

Specifically, in a scenario in which grouping is performed in the second determining manner, a network device may determine, according to a calculation formula $(N_{BWP}^{start} + N_{BWP}^{size})$ mod L, whether a quantity of virtual resource blocks included in the last virtual resource block group is less than L.

In another possible manner, in step 101, if the last physical resource block group in a carrier bandwidth part includes less than L physical resource blocks, the n physical resource block groups do not include the last physical resource block group in the carrier bandwidth part, but include a physical resource block group other than the last physical resource block group in the carrier bandwidth part.

The manner may be applied to a scenario in which grouping is performed in the foregoing first or second determining manner. When the network device does not write the last physical resource block group or the last virtual resource block group in the carrier bandwidth part into the interleaving matrix, the last physical resource block group directly corresponds to the last virtual resource block group. Regardless of whether a quantity of physical resource blocks included in the first physical resource block group is less than L, the first physical resource block group corresponds to the first virtual resource block group, and a case in which a virtual resource block group including L virtual resource blocks corresponds to a physical resource block group including less than L physical resource blocks does not occur. Therefore, a case in which a virtual resource block is mapped to a physical resource block outside the carrier bandwidth part does not occur, so that a complex-valued symbol can be correctly transmitted on the physical resource block.

Specifically, in a scenario in which grouping is performed in the first determining manner, the network device may determine, according to a calculation formula $N_{BWP}^{size} - L \cdot \lfloor N_{BWP}^{size}/L \rfloor$, whether a quantity of virtual resource blocks included in the last virtual resource block group is less than L.

Specifically, in a scenario in which grouping is performed in the second determining manner, the network device may determine, according to a calculation formula $L - N_{BWP}^{start}$ mod L, whether a quantity of virtual resource blocks included in the first virtual resource block group is less than L, and may determine, according to a calculation formula $(N_{BWP}^{start} + N_{BWP}^{size})$ mod L, whether a quantity of virtual resource blocks included in the last virtual resource block group is less than L.

In another possible manner, in step 101, the n physical resource block groups do not include a physical resource block group including physical resource blocks whose quantity is less than a reference value L in a carrier bandwidth part, but include a physical resource block group other than the physical resource block group including physical resource blocks whose quantity is less than the reference value L in the carrier bandwidth part.

The manner may be applied to a scenario in which grouping is performed in the foregoing first or second determining manner. When the network device does not write, into the interleaving matrix, the physical resource block group (the first physical resource block group and/or the last physical resource block group) including physical resource blocks whose quantity is less than the reference value L in the carrier bandwidth part, if physical resource block groups written into the interleaving matrix each include L physical resource blocks, or when the network device does not write, into the interleaving matrix, a virtual resource block group (the first virtual resource block group and/or the last virtual resource block group) including virtual resource blocks whose quantity is less than the reference value L in the carrier bandwidth part, if virtual resource block groups written into the interleaving matrix each include L virtual resource blocks, a case in which a virtual resource block group including L virtual resource blocks is mapped to a physical resource block group including less than L physical resource blocks does not occur. Therefore, a case in which a virtual resource block is mapped to a physical resource block outside the carrier bandwidth part does not occur, so that a complex-valued symbol can be correctly transmitted on the physical resource block.

Specifically, in a scenario in which grouping is performed in the first determining manner, the network device may determine, according to a calculation formula $N_{BWP}^{size} - L \cdot \lfloor N_{BWP}^{size}/L \rfloor$, whether a quantity of virtual resource blocks included in the last virtual resource block group is less than L.

Specifically, in a scenario in which grouping is performed in the second determining manner, the network device may determine, according to a calculation formula $L - N_{BWP}^{start}$ mod L, whether a quantity of virtual resource blocks included in the first virtual resource block group is less than L, and may determine, according to a calculation formula $(N_{BWP}^{start} + N_{BWP}^{size})$ mod L, whether a quantity of virtual resource blocks included in the last virtual resource block group is less than L.

In another possible manner, in step 101, if a quantity of virtual resource block groups in a carrier bandwidth part is greater than a quantity of elements in the interleaving matrix, the n physical resource block groups do not include the first physical resource block group and/or the last physical resource block group in the carrier bandwidth part, but include a physical resource block group other than the first physical resource block group and/or the last physical resource block group in the carrier bandwidth part.

The manner may be applied to a scenario in which grouping is performed in the foregoing second determining manner. When the quantity of virtual resource block groups in the carrier bandwidth part is greater than the quantity of elements in the interleaving matrix, a quantity of physical resource blocks included in the first physical resource block group in the carrier bandwidth part and a quantity of physical resource blocks included in the last physical resource block group in the carrier bandwidth part are both less than L.

When the quantity of virtual resource block groups in the carrier bandwidth part is greater than the quantity of elements in the interleaving matrix, if the first physical resource block group or the last physical resource block group in the carrier bandwidth part is not written into the interleaving matrix, or the first virtual resource block group or the last virtual resource block group in the carrier bandwidth part is not written into the interleaving matrix, the interleaving matrix is filled with written elements, and there is no null value. Therefore, a case in which a virtual resource block is mapped to a physical resource block outside the carrier bandwidth part does not occur, so that a complex-valued symbol can be correctly transmitted on the physical resource block.

When the quantity of virtual resource block groups in the carrier bandwidth part is greater than the quantity of elements in the interleaving matrix, if neither of the first physical resource block group and the last physical resource block group in the carrier bandwidth part is written into the interleaving matrix, a null value is inserted into the interleaving matrix, but physical resource block groups written into the interleaving matrix each include L physical resource blocks; or if neither of the first virtual resource block group and the last virtual resource block group in the carrier bandwidth part is written into the interleaving matrix, a null value is inserted into the interleaving matrix, and virtual resource block groups written into the interleaving matrix each include L virtual resource blocks. Therefore, a case in which a virtual resource block is mapped to a physical resource block outside the carrier bandwidth part does not occur, so that a complex-valued symbol can be correctly transmitted on the physical resource block. The quantity of elements in the interleaving matrix may be a product of a row quantity R and a column quantity C.

Figure 14:
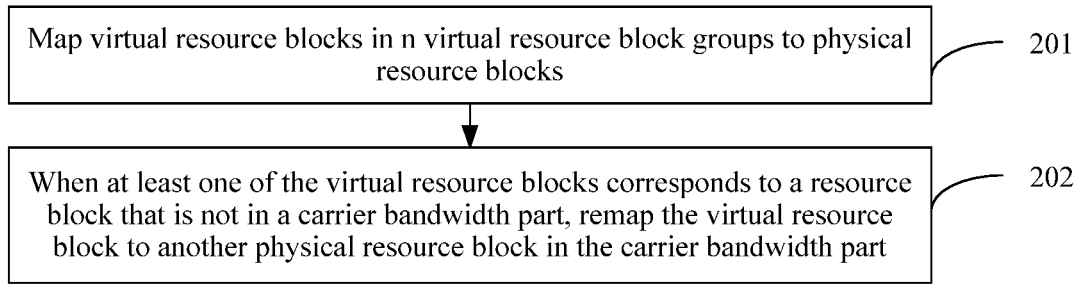
FIG. 14 is a flowchart of another resource mapping method according to an embodiment of this application.

Another embodiment of this application provides a resource mapping method. Referring to FIG. 14, the method may include the following steps:

201. A network device maps virtual resource blocks in n virtual resource block groups to physical resource blocks.

202. When at least one of the virtual resource blocks corresponds to a resource block that is not in a carrier bandwidth part, remap, to another physical resource block in the carrier bandwidth part, the virtual resource block that corresponds to the resource block that is not in the carrier bandwidth part.

In this way, each virtual resource block can be mapped to a physical resource block in the carrier bandwidth part, so that a complex-valued symbol on the virtual resource block can be correctly transmitted on the physical resource block.

Before step 201, the method may further include the following step:

203. The network device maps a complex-valued symbol to a subset of the virtual resource blocks in the n virtual resource block groups.

Specifically, for descriptions of step 203, refer to step 104. Details are not described herein again.

After step 203, the method may further include the following step:

204. The network device transmits complex-valued symbols based on a physical resource block corresponding to the subset of the virtual resource blocks in the n virtual resource block groups and the remapped physical resource block.

After determining the physical resource blocks mapped to the virtual resource blocks in the n virtual resource block groups, the network device may determine the physical resource block corresponding to the subset of the virtual resource blocks, to transmit, on the physical resource block corresponding to the subset of the virtual resource blocks, the complex-valued symbol mapped to the subset of the virtual resource blocks. Specifically, for descriptions of step 204, refer to step 105. Details are not described herein again.

Specifically, for a virtual resource block whose mapped physical resource block is in the carrier bandwidth part, the network device may transmit a complex-valued symbol on the physical resource block mapped to the virtual resource block, and for a virtual resource block whose mapped physical resource block is not in the carrier bandwidth part, the network device may transmit a complex-valued symbol on a remapped physical resource block.

Step 201 may specifically include the following steps:

2011. The network device writes n physical resource block groups into an interleaving matrix row by row, or the network device writes the n virtual resource block groups into an interleaving matrix column by column.

2012. The network device reads the n physical resource block groups from the interleaving matrix column by column, where the n read physical resource block groups are mapped to n virtual resource block groups; or the network device reads the n virtual resource block groups from the interleaving matrix row by row, where the n read virtual resource block groups are mapped to n physical resource block groups.

2013. The network device determines, based on the n physical resource block groups mapped to the n virtual resource block groups, the physical resource blocks mapped to the virtual resource blocks in the n virtual resource block groups.

For a process in which the network device determines, through interleaving in steps 2011 to 2013, the physical resource blocks mapped to the virtual resource blocks in the n virtual resource block groups, refer to the descriptions of steps 101 to 103. Details are not described herein again. Different from steps 101 to 103, the interleaving matrix in steps 2011 to 2013 may include but is not limited to the interleaving matrix provided in step 101 (for example, the interleaving matrix shown in each of FIG. 6 to FIG. 9), or may be another interleaving matrix. For example, in the interleaving matrix used in step 2011, a null value is inserted into a location other than the last column in the first row or the first column in the last row. For example, the interleaving matrix used in step 2011 may be shown in FIG. 13, and N null values are inserted into the last N columns in the last row of the interleaving matrix.

In a possible implementation, step 202 may specifically include: remapping, by the network device, a first virtual resource block to another preset physical resource block in the carrier bandwidth part.

For example, it is assumed that a row quantity of the interleaving matrix is R=2, the carrier bandwidth part includes nine VRBs with indexes 0 to 8, a reference value L=2, indexes of VRB groups are 0 to 4, the carrier bandwidth part includes nine PRBs with indexes 0 to 8, and indexes of PRB groups are 0 to 4. In this case, a column quantity of the interleaving matrix is C=3. After the PRB groups are written into the interleaving matrix row by row in step 201, the following is obtained:

$$\begin{bmatrix} 0 & 1 & 2 \\ 3 & 4 & * \end{bmatrix}$$

* represents a null value. Five PRB groups are read from the interleaving matrix column by column, that is, elements that are read from the interleaving matrix column by column include 0, 3, 1, 4, and 2. In this case, for a correspondence that is between a VRB group and a PRB group and that is determined in step 201, refer to the following Table 6. A VRB group with an index 3 corresponds to a PRB group with an index 4. The VRB group with the index 3 includes two VRBs to which two complex-valued symbols are mapped. The PRB group with the index 4 includes only one PRB with an index 8 in the carrier bandwidth part.

TABLE 6

| Index of a VRB group | Index of a VRB | Index of a PRB group after interleaving | Index of a PRB |
|---|---|---|---|
| 0 | 0, 1 | 0 | 0, 1 |
| 1 | 2, 3 | 3 | 6, 7 |
| 2 | 4, 5 | 1 | 2, 3 |
| 3 | 6, 7 | 4 | 8 |
| 4 | 8 | 2 | 4, 5 |

If allocated virtual resource blocks are virtual resource blocks 4 to 8, a resource block corresponding to the virtual resource block 7 is outside the carrier bandwidth part, and the network device may remap the virtual resource block 7 to another physical resource block in the carrier bandwidth part, for example, map the virtual resource block 7 to a physical resource block 0. In this case, for a correspondence between a virtual resource block and a physical resource block, refer to the following Table 7.

TABLE 7

| Index of a VRB group | Index of a VRB | Index of a PRB group after interleaving | Index of a PRB |
|---|---|---|---|
| 2 | 4, 5 | 1 | 2, 3 |
| 3 | 6, 7 | 4 | 8, 0 |
| 4 | 8 | 2 | 4, 5 |

Optionally, the another preset physical resource block in the carrier bandwidth part is determined based on a frequency domain location of the carrier bandwidth part, a size of the carrier bandwidth part, and/or the reference value L.

Optionally, the another preset physical resource block in the carrier bandwidth part is a physical resource block that is not mapped and that is in a physical resource block group corresponding to a virtual resource block group with a largest index.

For example, if the correspondence that is between a virtual resource block and a physical resource block and that is determined in step 201 is shown in Table 6, and the reference value L is 2, the resource block corresponding to the virtual resource block 7 is outside the carrier bandwidth part, and the network device may remap the virtual resource block 7 to the physical resource block that is not mapped and that is in the physical resource block group corresponding to the virtual resource block group with the largest index, that is, map the virtual resource block 7 to a physical resource block 5 in a physical resource block group 2 corresponding to a virtual resource block group 4. In this case, for the correspondence between a virtual resource block and a physical resource block, refer to the following Table 8.

TABLE 8

| Index of a VRB group | Index of a VRB | Index of a PRB group after interleaving | Index of a PRB |
|---|---|---|---|
| 0 | 0, 1 | 0 | 0, 1 |
| 1 | 2, 3 | 3 | 6, 7 |
| 2 | 4, 5 | 1 | 2, 3 |
| 3 | 6, 7 | 4 | 8, 5 |
| 4 | 8 | 2 | 4 |

In a possible implementation, step 202 may specifically include: remapping, by the network device to another preset physical resource block group in the carrier bandwidth part, a virtual resource block group corresponding to a first virtual resource block.

For example, if a correspondence that is between a virtual resource block and a physical resource block and that is determined in step 201 is shown in Table 6, a reference value L is 2, and allocated virtual resource blocks are virtual resource blocks 4 to 8, a resource block corresponding to the virtual resource block 7 is outside the carrier bandwidth part, and the network device may remap a virtual resource block group 3 to a physical resource block group in the carrier bandwidth part, for example, map the virtual resource block group 3 to a physical resource block group 0, that is, respectively map the virtual resource blocks 6 and 7 to physical resource blocks 0 and 1. In this case, for the correspondence between a virtual resource block and a physical resource block, refer to the following Table 9.

TABLE 9

| Index of a VRB group | Index of a VRB | Index of a PRB group after interleaving | Index of a PRB |
|---|---|---|---|
| 2 | 4, 5 | 1 | 2, 3 |
| 3 | 6, 7 | 0 | 0, 1 |
| 4 | 8 | 2 | 4, 5 |

Optionally, the another preset physical resource block group in the carrier bandwidth part is determined based on a frequency domain location of the carrier bandwidth part, a size of the carrier bandwidth part, and/or the reference value L.

Optionally, the another preset physical resource block group in the carrier bandwidth part is a physical resource block group corresponding to a virtual resource block group with a largest index.

For example, if the correspondence that is between a virtual resource block and a physical resource block and that is determined in step 201 is shown in Table 6, and the reference value L is 2, the resource block corresponding to the virtual resource block 7 is outside the carrier bandwidth part, and the network device may remap the virtual resource block group 3 to the physical resource block group corresponding to the virtual resource block group with the largest index, that is, map the virtual resource block group 3 to a physical resource block group 2 corresponding to a virtual resource block group 4, and respectively map the virtual resource blocks 6 and 7 to physical resource blocks 4 and 5. Optionally, the network device maps the virtual resource block group 4 to a physical resource block group 4 corresponding to a virtual resource block group 3, and maps the virtual resource block 8 to a physical resource block 8. In this case, for the correspondence between a virtual resource block and a physical resource block, refer to the following Table 10.

TABLE 10

| Index of a VRB group | Index of a VRB | Index of a PRB group after interleaving | Index of a PRB |
|---|---|---|---|
| 0 | 0, 1 | 0 | 0, 1 |
| 1 | 2, 3 | 3 | 6, 7 |
| 2 | 4, 5 | 1 | 2, 3 |
| 3 | 6, 7 | 2 | 4, 5 |
| 4 | 8 | 4 | 8 |

In another possible implementation, step 202 may specifically include: determining, by the network device, another physical resource block based on a preset offset and a physical resource block corresponding to a first virtual resource block, and remapping the first virtual resource block to the another physical resource block.

In another possible implementation, step 202 may specifically include: determining, by the network device, an offset based on the carrier bandwidth part and a reference value L, determining another physical resource block based on the offset and a physical resource block corresponding to a first virtual resource block, and remapping the first virtual resource block to the another physical resource block.

In a possible implementation, the n virtual resource block groups are n virtual resource block groups corresponding to the carrier bandwidth part. The implementation may be applied to a scenario in which grouping is performed in the foregoing first determining manner.

In another possible implementation, the n virtual resource block groups are a proper subset of m virtual resource block groups corresponding to the carrier bandwidth part, and the n virtual resource block groups include the last virtual resource block group in the m virtual resource block groups. This manner may be applied to a scenario in which grouping is performed in the foregoing second determining manner and a quantity of virtual resource blocks included in the first virtual resource block group in the carrier bandwidth part and a quantity of virtual resource blocks included in the last virtual resource block group in the carrier bandwidth part are both less than L. Specifically, in the scenario, the n virtual resource block groups may be the second virtual resource block group to the last virtual resource block group in the m virtual resource block groups.

Figure 15:
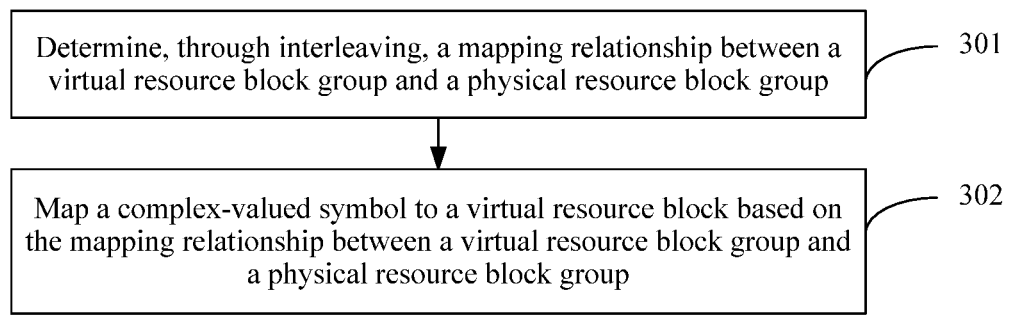
FIG. 15 is a flowchart of another resource mapping method according to an embodiment of this application.

Another embodiment of this application provides a resource mapping method. Referring to FIG. 15, the method may mainly include the following steps:

301. A network device determines, through interleaving, a mapping relationship between a virtual resource block group and a physical resource block group.

302. The network device maps a complex-valued symbol to a virtual resource block based on the mapping relationship between a virtual resource block group and a physical resource block group.

Step 301 may specifically include the following steps:

3011. The network device writes n physical resource block groups into an interleaving matrix row by row, or the network device writes n virtual resource block groups into an interleaving matrix column by column.

3012. The network device reads the n physical resource block groups from the interleaving matrix column by column, where the n read physical resource block groups are mapped to n virtual resource block groups; or the network device reads the n virtual resource block groups from the interleaving matrix row by row, where the n read virtual resource block groups are mapped to n physical resource block groups.

For step 3011 and step 3012, refer to the related descriptions of steps 101 and 102. Details are not described herein again.

It should be noted that the interleaving matrix in step 3011 may include but is not limited to the interleaving matrix provided in step 101 and the interleaving matrix represented by the foregoing matrix 3. For example, the interleaving matrix in step 3011 may alternatively be the interleaving matrix shown in FIG. 13.

Step 301 may specifically include the following step:

3010. The network device determines, through interleaving, the mapping relationship between a virtual resource block group and a physical resource block group, and physical resource blocks corresponding to virtual resource blocks.

After step 302, the method may further include the following step:

303. The network device transmits the complex-valued symbol on the physical resource block.

In a possible implementation of step 302, the network device may determine, based on the mapping relationship between a virtual resource block group and a physical resource block group, a first virtual resource block in allocated virtual resource blocks, and a terminal maps a complex-valued symbol to a virtual resource block other than the first virtual resource block in the allocated virtual resource blocks, where a virtual resource block group corresponding to the first virtual resource block is mapped to a physical resource block group with a largest index in a carrier bandwidth part.

When the network device is a terminal or a base station, the allocated virtual resource blocks may be virtual resource blocks that are in the carrier bandwidth part and that are allocated by the base station to the terminal.

For example, when the network device maps complex-valued symbols to the allocated virtual resource blocks, if an allocated virtual resource block corresponds to a resource block outside the carrier bandwidth part, in a possible implementation, the network device may not map a complex-valued symbol to the virtual resource block, but maps a complex-valued symbol to a virtual resource block in the allocated virtual resource blocks. To be specific, the network device maps a complex-valued symbol to a virtual resource block group based on the mapping relationship between a virtual resource block group and a physical resource block group. For example, if the mapping relationship between a virtual resource block group and a physical resource block group in step 301 is shown in Table 6, a reference value L is 2, the allocated virtual resource blocks are virtual resource blocks 4 to 8, and a physical resource block group 4 includes only one physical resource block 8, in step 302, the network device does not map a complex-valued symbol to the virtual resource block 7, and a virtual resource block group 3 may include only one virtual resource block. For a correspondence between an index of a virtual resource block group and an index of a virtual resource block, refer to the foregoing Table 5.

In another possible implementation of step 302, a terminal determines a first virtual resource block in allocated virtual resource blocks, and the terminal remaps a complex-valued symbol on the first virtual resource block to a second virtual resource block, where a virtual resource block group corresponding to the first virtual resource block is mapped to a physical resource block group with a largest index in a carrier bandwidth part.

For example, when the network device maps complex-valued symbols to the allocated virtual resource blocks, if a virtual resource block corresponds to a physical resource block outside the carrier bandwidth part, in another possible implementation, the network device may not map a complex-valued symbol to the virtual resource block, but maps, to a virtual resource block group with a largest index, complex-valued symbols corresponding to L resource blocks. For example, if a correspondence that is between a virtual resource block and a physical resource block and that is determined in step 301 is shown in Table 6, a reference value L is 2, and the allocated virtual resource blocks are virtual resource blocks 4 to 8, in step 302, the network device does not map a complex-valued symbol to the virtual resource block 7. In addition, it is assumed that a virtual resource block group 4 includes two virtual resource blocks. The network device maps, to the virtual resource block group 4, complex-valued symbols corresponding to two resource blocks. For a correspondence between an index of a virtual resource block group and an index of a virtual resource block group, refer to the following Table 11. No complex-valued symbol is mapped to the virtual resource block 7, and a virtual resource block 9 may be understood as an invoked virtual resource block outside the carrier bandwidth part.

TABLE 11

| Index of a VRB group | Index of a VRB | Index of a mapped PRB group after interleaving | Index of a PRB |
|---|---|---|---|
| 2 | 4, 5 | 1 | 2, 3 |
| 3 | 6, 7 | 4 | 8 |
| 4 | 8, 9 | 2 | 4, 5 |

When the complex-valued symbols are mapped to the allocated virtual resource blocks, only mapping on a virtual resource block corresponding to a resource block outside the carrier bandwidth part may be adjusted, for example, a complex-valued symbol that originally needs to be mapped to the virtual resource block 7 is mapped to the virtual resource block 9; or mapping on all subsequent virtual resource blocks starting from a virtual resource block corresponding to a resource block outside the carrier bandwidth part may be adjusted, for example, a complex-valued symbol that originally needs to be mapped to the virtual resource block 7 is mapped to the virtual resource block 8, and a complex-valued symbol that originally needs to be mapped to the virtual resource block 8 is mapped to the virtual resource block 9.

It can be learned that, based on the resource mapping method provided in this embodiment of this application, a quantity of resource blocks included in a virtual resource block group including a virtual resource block to which a complex-valued symbol is mapped can match a quantity of resource blocks included in a corresponding physical resource block group, thereby ensuring that the complex-valued symbol on the virtual resource block can be correctly transmitted on a physical resource block.

The foregoing mainly describes the solutions provided in the embodiments of this application from a perspective of the method. It may be understood that, to implement the foregoing functions, the network device includes a corresponding hardware structure and/or software module for performing each function. A person skilled in the art should be easily aware that, in combination with algorithms steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that in the embodiments of this application, module division is an example, and is merely logical function division. In actual implementation, another division manner may be used.

Figure 16:
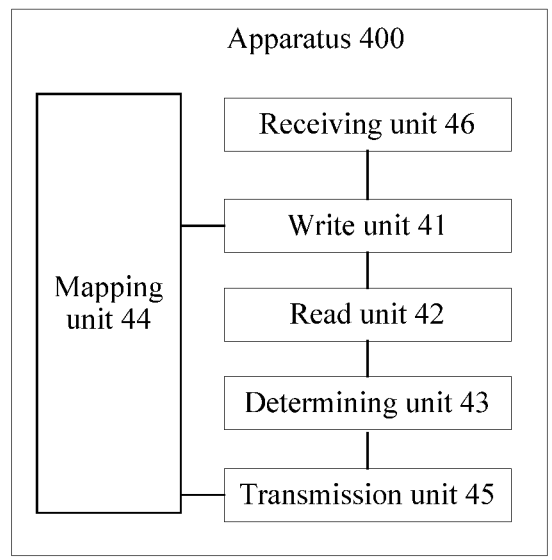
FIG. 16 is a schematic structural diagram of an apparatus according to an embodiment of this application.

When each function module is obtained through division for each corresponding function, FIG. 16 is a possible schematic composition diagram of an apparatus in the foregoing method embodiments. The apparatus is the network device or the chip in the foregoing embodiments, for example, a terminal or a base station. As shown in FIG. 16, the apparatus 400 may include a write unit 41, a read unit 42, and a determining unit 43.

In some embodiments, the write unit 41 may be configured to: write n physical resource block groups into an interleaving matrix row by row, or write n virtual resource block groups into an interleaving matrix column by column, where N null values are inserted into intersections between the first row and the last N columns of the interleaving matrix or intersections between the last row and the first N columns of the interleaving matrix, n is a positive integer, and N is a natural number. The read unit 42 may be configured to: read the n physical resource block groups from the interleaving matrix column by column, where the n read physical resource block groups are mapped to n virtual resource block groups; or read the n virtual resource block groups from the interleaving matrix row by row, where the n read virtual resource block groups are mapped to n physical resource block groups. The determining unit 43 may be configured to determine, based on the n physical resource block groups mapped to the n virtual resource block groups, physical resource blocks mapped to virtual resource blocks in the n virtual resource block groups.

Further, the apparatus 400 may further include a mapping unit 44, a transmission unit 45, and a receiving unit 46. The mapping unit 44 may be configured to support the apparatus 400 in performing step 104 in FIG. 12. The transmission unit may be configured to support the apparatus 400 in performing step 105 in FIG. 12. The receiving unit 46 may be configured to support the apparatus 400 in performing step 106 in FIG. 12. In addition, each unit in FIG. 16 may be further configured to perform another process of the technology described in this specification.

It should be noted that all related content of the steps in the foregoing method embodiments can be cited in function descriptions of corresponding function modules, and details are not described herein again.

The apparatus provided in this embodiment of this application is configured to perform the foregoing resource mapping method, and therefore can achieve a same effect as the foregoing resource mapping method.

Figure 17:
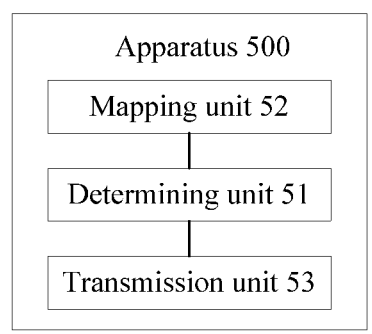
FIG. 17 is a schematic structural diagram of another apparatus according to an embodiment of this application.

When each function module is obtained through division for each corresponding function, FIG. 17 is another possible schematic composition diagram of an apparatus 500 in the foregoing embodiments. The apparatus 500 is the network device or the chip in the foregoing embodiments, for example, a terminal or a base station. As shown in FIG. 17, the apparatus 500 may include a determining unit 51, a mapping unit 52, and a transmission unit 53.

In some embodiments, the determining unit 51 may be configured to perform step 301 in FIG. 15, and the determining unit 52 may be configured to perform step 302 in FIG. 15.

Further, the determining unit 51 may be further configured to perform steps 3010 to 3012 in the foregoing method embodiments, and the transmission unit 53 may be configured to perform step 303 in the foregoing embodiments. In addition, each unit in FIG. 17 may be further configured to perform another process of the technology described in this specification.

It should be noted that all related content of the steps in the foregoing method embodiments can be cited in function descriptions of corresponding function modules, and details are not described herein again.

The apparatus 500 provided in this embodiment of this application is configured to perform the foregoing resource mapping method, and therefore can achieve a same effect as the foregoing resource mapping method.

Figure 18:
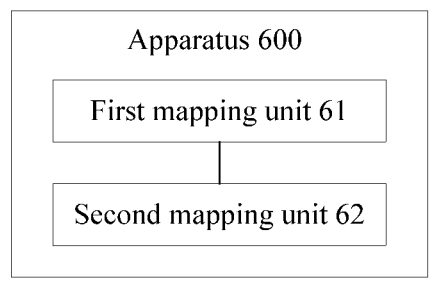
FIG. 18 is a schematic structural diagram of another apparatus according to an embodiment of this application.

When each function module is obtained through division for each corresponding function, FIG. 18 is another possible schematic composition diagram of an apparatus 600 in the foregoing embodiments. The apparatus 600 is the network device or the chip in the foregoing embodiments, for example, a terminal or a base station. As shown in FIG. 18, the apparatus 600 may include at least one mapping unit.

When the at least one mapping unit includes a first mapping unit 61 and a second mapping unit 62, the first mapping unit 61 may be configured to perform step 201 in FIG. 14, the second mapping unit 62 may be configured to perform step 202 in FIG. 14, and the first mapping unit 61 may be specifically further configured to perform steps 2011 to 2013 in the foregoing method embodiments.

When the at least one mapping unit is one mapping unit, the mapping unit may perform functions of the first mapping unit 61 and the second mapping unit 62.

In addition, each unit in FIG. 18 may be further configured to perform another process of the technology described in this specification.

It should be noted that all related content of the steps in the foregoing method embodiments can be cited in function descriptions of corresponding function modules, and details are not described herein again.

The apparatus 600 provided in this embodiment of this application is configured to perform the foregoing resource mapping method, and therefore can achieve a same effect as the foregoing resource mapping method.

In another embodiment, a person skilled in the art may consider corresponding the modules in the apparatus 400 to the apparatus 600 to the components in FIG. 3, and any one of the apparatus 16 to the apparatus 18 may be implemented by using the structure shown in FIG. 3.

Based on the descriptions of the foregoing implementations, a person skilled in the art may understand that, for the purpose of convenient and brief description, division of the foregoing function modules is only used as an example for description. In actual application, the foregoing functions can be allocated to different function modules and implemented as required, that is, an inner structure of an apparatus is divided into different function modules to implement all or some of the functions described above.

In the several embodiments provided in this application, it should be understood that the disclosed apparatuses and methods may be implemented in other manners. For example, the apparatus embodiments described above are merely examples. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the current system, or all or some of the technical solutions may be implemented in a form of a software product. The software product is stored in a storage medium, and includes several instructions for instructing a device (which may be a single-chip microcomputer, a chip, or the like) or a processor to perform all or some of the steps of the methods in the embodiments of this application. The foregoing storage medium includes: any medium that can store program code, such as a USB flash drive, a removable hard disk, a read-only memory (ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    writing, by a device, n virtual resource block groups into an interleaving matrix data structure, wherein the n virtual resource block groups do not comprise a last virtual resource block group in a carrier bandwidth part; and
    reading, by the device, the n virtual resource block groups from the interleaving matrix data structure, wherein the n virtual resource block groups are mapped to n physical resource block groups, wherein the last virtual resource block group in the carrier bandwidth part corresponds to a last physical resource block group in the carrier bandwidth part;
    where N null values are inserted into intersections between a first row and a last N columns of the interleaving matrix data structure, wherein n is a positive integer, and wherein N is a natural number.

2. The method according to claim 1, wherein:
    a quantity of physical resource blocks comprised in a first physical resource block group in the carrier bandwidth part is $L-N_{BWP}^{start}$ mod L, a second physical resource block group to a penultimate physical resource block group in the carrier bandwidth part each comprises L physical resource blocks, and a quantity of physical resource blocks comprised in the last physical resource block group is $(N_{BWP}^{start}+N_{BWP}^{size})$ mod L; and
    the carrier bandwidth part comprises $\lceil N_{BWP}^{size}/L \rceil$ or $\lceil N_{BWP}^{size}/L \rceil+1$ physical resource block groups, the carrier bandwidth part comprises $N_{BWP}^{size}$ physical resource blocks, and the carrier bandwidth part corresponds to $N_{BWP}^{size}$ virtual resource blocks, $N_{BWP}^{start}$ represents a location of a start physical resource block in the carrier bandwidth part, and in common resource blocks, and mod represents a modulo operation.

3. The method according to claim 2, further comprising:
    grouping the $N_{BWP}^{size}$ physical resource blocks into the physical resource block groups; and
    numbering the physical resource block groups in an order of indexes of the common resource blocks.

4. The method according to claim 1, wherein
    a quantity of virtual resource blocks comprised in a first virtual resource block group in the carrier bandwidth part is $L-N_{BWP}^{start}$ mod L, a second virtual resource block group to a penultimate virtual resource block group in the carrier bandwidth part each comprises L virtual resource blocks, and a quantity of virtual resource blocks comprised in the last virtual resource block group is $(N_{BWP}^{start}+N_{BWP}^{size})$ mod L; and
    the carrier bandwidth part comprises $\lceil N_{BWP}^{size}/L \rceil$ or $\lceil N_{BWP}^{size}/L \rceil+1$ virtual resource block groups, the carrier bandwidth part comprises $N_{BWP}^{size}$ physical resource blocks, and corresponds to virtual resource blocks, $N_{BWP}^{start}$ represents a location of the start physical resource block in the carrier bandwidth part and in common resource blocks, and mod represents a modulo operation.

5. The method according to claim 4, further comprising:
    grouping the $N_{BWP}^{size}$ virtual resource blocks into the virtual resource block groups; and
    numbering the virtual resource block groups in an order of the indexes of the common resource blocks.

6. The method according to claim 1, wherein
    a first physical resource block group to a penultimate physical resource block group in the carrier bandwidth part each comprises L physical resource blocks, a quantity of physical resource blocks in the last physical resource block group in the carrier bandwidth part is $N_{BWP}^{size}-L \cdot \lfloor N_{BWP}^{size}/L \rfloor$, and $\lfloor \; \rfloor$ means rounding down; and
    the carrier bandwidth part comprises $\lceil N_{BWP}^{size}/L \rceil$ physical resource block groups, $\lceil \; \rceil$ means rounding up, the carrier bandwidth part comprises $N_{BWP}^{size}$ physical resource blocks, and the carrier bandwidth part corresponds to $N_{BWP}^{size}$ virtual resource blocks.

7. The method according to claim 6, further comprising:
    grouping the $N_{BWP}^{size}$ physical resource blocks into the $\lceil N_{BWP}^{size}/L \rceil$ physical resource block groups; and
    numbering the physical resource block groups in an order of indexes of the $N_{BWP}^{size}$ physical resource blocks.

8. The method according to claim 1, wherein:
    a first virtual resource block group to a penultimate virtual resource block group in the carrier bandwidth part each comprises L virtual resource blocks, and a quantity of virtual resource blocks in the last virtual resource block group in the carrier bandwidth part is $N_{BWP}^{size}-L \cdot \lfloor N_{BWP}^{size}/L \rfloor$; and
    the carrier bandwidth part corresponds to $\lceil N_{BWP}^{size}/L \rceil$ virtual resource block groups, the carrier bandwidth part comprises $N_{BWP}^{size}$ physical resource blocks, and the carrier bandwidth part corresponds to $N_{BWP}^{size}$ virtual resource blocks.

9. The method according to claim 8, further comprising:
    grouping the virtual resource blocks into the virtual resource block groups; and
    numbering the virtual resource block groups in an order of indexes of the virtual resource blocks.

10. An apparatus, comprising:
    a non-transitory memory storage comprising instructions; and
    one or more processors in communication with the non-transitory memory storage, wherein the one or more processors execute the instructions to:
        write n virtual resource block groups into an interleaving matrix data structure, wherein the n virtual resource block groups do not comprise a last virtual resource block group in a carrier bandwidth part; and
        read the n virtual resource block groups from the interleaving matrix data structure, wherein the n virtual resource block groups are mapped to n physical resource block groups, wherein the last virtual resource block group in the carrier bandwidth part corresponds to a last physical resource block group in the carrier bandwidth part;
    where N null values are inserted into intersections between a first row and a last N columns of the interleaving matrix data structure, wherein n is a positive integer, and wherein N is a natural number.

11. The apparatus according to claim 10, wherein:
    a quantity of physical resource blocks comprised in a first physical resource block group in the carrier bandwidth part is $L-N_{BWP}^{start}$ mod L, a second physical resource block group to a penultimate physical resource block group in the carrier bandwidth part each comprises L physical resource blocks, and a quantity of physical resource blocks comprised in the last physical resource block group is $(N_{BWP}^{start}+N_{BWP}^{size})$ mod L; and
    the carrier bandwidth part comprises $\lceil N_{BWP}^{size}/L \rceil$ or $\lceil N_{BWP}^{size}/L \rceil+1$ physical resource block groups, the carrier bandwidth part comprises $N_{BWP}^{size}$ physical resource blocks, and the carrier bandwidth part corresponds to $N_{BWP}^{size}$ virtual resource blocks, $N_{BWP}^{start}$ represents a location of a start physical resource block in the carrier bandwidth part and in common resource blocks, and mod represents a modulo operation.

12. The apparatus according to claim 11, wherein the instructions comprise further instructions to:
group the $N_{BWP}^{size}$ physical resource blocks into the physical resource block groups; and
number the physical resource block groups in an order of indexes of the common resource blocks.

13. The apparatus according to claim 10, wherein:
a quantity of virtual resource blocks comprised in a first virtual resource block group in the carrier bandwidth part is $L-N_{BWP}^{start}$ mod L, a second physical resource block group to a penultimate physical resource block group in the carrier bandwidth part each comprises L virtual resource blocks, and a quantity of virtual resource blocks comprised in the last virtual resource block group is $(N_{BWP}^{start}+N_{BWP}^{size})$mod L; and
the carrier bandwidth part comprises $\lceil N_{BWP}^{size}/L \rceil$ or $\lceil N_{BWP}^{size}/L \rceil+1$ virtual resource block groups, the carrier bandwidth part comprises $N_{BWP}^{size}$ physical resource blocks, and the carrier bandwidth part corresponds to $N_{BWP}^{size}$ virtual resource blocks, $N_{BWP}^{start}$ represents a location of the start physical resource block in the carrier bandwidth part and in common resource blocks, and mod represents a modulo operation.

14. The apparatus according to claim 13, wherein the instructions include further instructions to:
group the $N_{BWP}^{size}$ virtual resource blocks into the virtual resource block groups; and
number the virtual resource block groups in an order of the indexes of the common resource blocks.

15. The apparatus according to claim 10, wherein a first physical resource block group to a penultimate physical resource block group in the carrier bandwidth part each comprises L physical resource blocks, a quantity of physical resource blocks in the last physical resource block group is $N_{BWP}^{size}-L\cdot\lfloor N_{BWP}^{size}/L \rfloor$, and $\lfloor\ \rfloor$ means rounding down; and
the carrier bandwidth part comprises $\lceil N_{BWP}^{size}/L \rceil$ physical resource block groups, $\lceil\ \rceil$ means rounding up, the carrier bandwidth part comprises $N_{BWP}^{size}$ physical resource blocks, and the carrier bandwidth part corresponds to $N_{BWP}^{size}$ virtual resource blocks.

16. The apparatus according to claim 10, wherein the instructions comprise further instructions to:
group $N_{BWP}^{size}$ physical resource blocks into the physical resource block groups; and
number the physical resource block groups in an order of indexes of the $N_{BWP}^{size}$ physical resource blocks.

17. The apparatus according to claim 10, wherein:
a first virtual resource block group to a penultimate virtual resource block group in the carrier bandwidth part each comprises L virtual resource blocks, and a quantity of virtual resource blocks in the last virtual resource block group is $N_{BWP}^{size}-L\cdot\lfloor N_{BWP}^{size}/L \rfloor$; and
the carrier bandwidth part corresponds to $\lceil N_{BWP}^{size}/L \rceil$ virtual resource block groups, the carrier bandwidth part comprises $N_{BWP}^{size}$ physical resource blocks, and the carrier bandwidth part corresponds to $N_{BWP}^{size}$ virtual resource blocks.

18. The apparatus according to claim 17, wherein the instructions comprise further instructions to:
group the $N_{BWP}^{size}$ virtual resource blocks; and
number the virtual resource block groups in an order of indexes of the $N_{BWP}^{size}$ virtual resource blocks.

* * * * *